US007757085B2

(12) United States Patent
Lyle

(10) Patent No.: US 7,757,085 B2
(45) Date of Patent: Jul. 13, 2010

(54) METHOD AND APPARATUS FOR ENCRYPTING DATA TRANSMITTED OVER A SERIAL LINK

(75) Inventor: James D. Lyle, Santa Clara, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 747 days.

(21) Appl. No.: 11/543,501

(22) Filed: Oct. 5, 2006

(65) Prior Publication Data

US 2008/0046728 A1 Feb. 21, 2008

Related U.S. Application Data

(60) Continuation of application No. 11/499,464, filed on Aug. 4, 2006, now abandoned, which is a division of application No. 09/945,278, filed on Aug. 31, 2001, now Pat. No. 7,131,004.

(51) Int. Cl.
*H04L 9/32* (2006.01)
(52) U.S. Cl. ....................................................... 713/169
(58) Field of Classification Search .................. 713/169
See application file for complete search history.

(56) References Cited

U.S. PATENT DOCUMENTS 5,534,857 A 7/1996 Laing et al. ................ 340/5.74

5,682,534 A 10/1997 Kapoor et al. .............. 719/328

OTHER PUBLICATIONS

*High-Bandwidth Digital Content Protection System*, Revision 1.0, by Intel Corporation, Feb. 17, 2000, pp. 1-60.
*High-Bandwith Digital Content Protection System Revision 1.0 Erratum*, by Intel Corporation, Mar. 19, 2001, pp. 1-9.
*Upstream Link for High-bandwidth Digital Content Protection*, Revision 1.00, by Intel Corporation, Jan. 26, 2001, pp. 1-38.
Irwin, Keith *Four Simple Cryptographic Attacks on HDCP*, pp. 1-7, downloaded from the Internet on Aug. 21, 2001 from http://www/angelfire.com/realm/keithirwin/HDCPAttacks.html.
http://www.tidbits.com/tb-issues/TidBITS-234.html, http://www.tidbits.com/tb-issues/TidBITS-235.html, http://web.archive.org/web/20010424183636/http://www.sassafras.com/docs50/starting.htm, http://quest.cc.purdue.edu/~aeh/archive/1996/msg00179.html. http://www.kidsfirstsoccer.com/w3infotec/pc_n.htm, http://www.macromedia.com/support/licensing.

*Primary Examiner*—Jacob Lipman
(74) *Attorney, Agent, or Firm*—Girard & Equitz LLP

(57) ABSTRACT

A system for implementing a content protection protocol to encrypt data, including transmitters and receivers to which key selection vectors of a vector set have been distributed, wherein a subset of the key selection vectors in the vector set has not been distributed to any of the transmitters or any of the receivers, and a method for enabling transmitters and receivers to implement a content protection protocol including by distributing key selection vectors of a vector set, and private key sets, to the transmitters and receivers while reserving a subset of the key selection vectors of the vector set.

8 Claims, 6 Drawing Sheets

| INPUT | B0 | B1 | B2 | B3 | B4 | B5 | B6 | B7 | K0 | K1 | K2 | K3 | K4 | K5 | K6 | K7 |
|---|---|---|---|---|---|---|---|---|---|---|---|---|---|---|---|---|
| ORIGIN | Bz | Bz | Bz | Bz | Bz | Bz | Bz | By | Kz | Kz | Kz | Kz | Kz | Kz | Kz | Ky |
| OUTPUT BIT | | | | | | | | | | | | | | | | |
| 0 | 17 | 26 | 22 | 27 | 21 | 18 | 2 | 5 | 3 | 6 | 0 | 9 | 4 | 22 | 5 | 10 |
| 1 | 5 | 20 | 15 | 24 | 2 | 25 | 0 | 16 | 20 | 18 | 7 | 23 | 15 | 5 | 3 | 25 |
| 2 | 22 | 5 | 14 | 16 | 25 | 17 | 20 | 11 | 7 | 19 | 2 | 10 | 22 | 4 | 13 | 21 |
| 3 | 19 | 3 | 15 | 11 | 21 | 16 | 27 | 1 | 6 | 14 | 9 | 8 | 17 | 18 | 12 | 24 |
| 4 | 19 | 6 | 17 | 18 | 22 | 7 | 9 | 12 | 25 | 6 | 5 | 2 | 10 | 15 | 21 | 8 |
| 5 | 3 | 7 | 4 | 8 | 16 | 6 | 5 | 17 | 27 | 14 | 2 | 4 | 24 | 19 | 1 | 12 |
| 6 | 8 | 21 | 27 | 2 | 11 | 24 | 12 | 3 | 17 | 26 | 4 | 16 | 27 | 7 | 22 | 11 |
| 7 | 9 | 5 | 7 | 4 | 8 | 13 | 3 | 15 | 9 | 10 | 19 | 11 | 7 | 6 | 8 | 23 |
| 8 | 26 | 13 | 23 | 10 | 11 | 7 | 15 | 19 | 13 | 12 | 18 | 24 | 15 | 23 | 7 | 16 |
| 9 | 1 | 0 | 19 | 11 | 13 | 16 | 24 | 18 | 0 | 5 | 20 | 25 | 1 | 24 | 9 | 27 |
| 10 | 26 | 13 | 9 | 14 | 10 | 4 | 1 | 2 | 14 | 23 | 27 | 25 | 17 | 19 | 1 | 22 |
| 11 | 21 | 15 | 5 | 3 | 13 | 25 | 16 | 27 | 6 | 21 | 17 | 15 | 26 | 11 | 16 | 7 |
| 12 | 20 | 7 | 18 | 12 | 17 | 1 | 16 | 0 | 11 | 22 | 20 | 0 | 26 | 23 | 17 | 2 |
| 13 | 14 | 23 | 1 | 12 | 24 | 6 | 18 | 9 | 8 | 4 | 3 | 14 | 20 | 26 | 23 | 15 |
| 14 | 19 | 6 | 21 | 25 | 23 | 1 | 10 | 8 | 19 | 0 | 18 | 2 | 13 | 8 | 24 | 14 |
| 15 | 3 | 0 | 27 | 23 | 19 | 8 | 4 | 7 | 16 | 21 | 24 | 25 | 12 | 27 | 15 | 18 |
| 16 | 6 | 5 | 14 | 22 | 24 | 18 | 2 | 21 | 3 | 5 | 8 | 25 | 7 | 27 | 2 | 26 |
| 17 | 3 | 4 | 2 | 6 | 22 | 14 | 12 | 26 | 11 | 14 | 23 | 17 | 22 | 13 | 19 | 4 |
| 18 | 25 | 21 | 19 | 9 | 10 | 15 | 13 | 22 | 1 | 16 | 14 | 11 | 12 | 6 | 10 | 19 |
| 19 | 23 | 11 | 10 | 20 | 1 | 12 | 14 | 4 | 21 | 1 | 10 | 20 | 18 | 26 | 9 | 13 |
| 20 | 11 | 26 | 20 | 17 | 8 | 23 | 0 | 24 | 20 | 21 | 9 | 25 | 12 | 3 | 15 | 0 |
| 21 | 9 | 17 | 26 | 4 | 27 | 0 | 15 | 6 | 18 | 12 | 21 | 27 | 1 | 16 | 24 | 20 |
| 22 | 22 | 12 | 2 | 10 | 7 | 20 | 25 | 13 | 13 | 0 | 3 | 16 | 22 | 11 | 26 | 9 |
| 23 | 27 | 24 | 26 | 8 | 0 | 9 | 18 | 23 | 2 | 0 | 13 | 5 | 4 | 8 | 10 | 3 |

FIG. 5
(PRIOR ART)

METHOD AND APPARATUS FOR ENCRYPTING DATA TRANSMITTED OVER A SERIAL LINK

CROSS-REFERENCE TO RELATED APPLICATIONS

This is a continuation of application Ser. No. 11/499,464, entitled METHOD AND APPARATUS FOR ENCRYPTING DATA TRANSMITTED OVER A SERIAL LINK, filed Aug. 4, 2006, now abandoned and assigned to the assignee of the present application, which is a division of application Ser. No. 09/945,278, entitled METHOD AND APPARATUS FOR ENCRYPTING DATA TRANSMITTED OVER A SERIAL LINK, filed on Aug. 31, 2001, now U.S. Pat. No. 7,131,004 and also assigned to the assignee of the present application.

TECHNICAL FIELD OF THE INVENTION

The invention pertains to encryption of data (e.g., video data) to be transmitted over a serial link, and to decryption of encrypted data that has been transmitted over a serial link. Some embodiments of the invention are methods and apparatus for encrypting and decrypting data in accordance with an improved version of the conventional High-bandwidth Digital Content Protection ("HDCP") protocol.

BACKGROUND OF THE INVENTION

There are various, well-known serial links for transmitting video data and other data. One conventional serial link is known as a transition minimized differential signaling interface ("TMDS" link). This link is used primarily for high-speed transmission of video data from a set-top box to a television, and also for high-speed transmission of video data from a host processor (e.g., a personal computer) to a monitor. Among the characteristics of a TMDS link are the following:

1. video data are encoded and then transmitted as encoded words (each 8-bit word of digital video data is converted to an encoded 10-bit word before transmission);
   a. the encoding determines a set of "in-band" words and a set of "out-of-band" words (the encoder can generate only "in-band" words in response to video data, although it can generate "out-of-band" words in response to control or sync signals. Each in-band word is an encoded word resulting from encoding of one input video data word. All words transmitted over the link that are not in-band words are "out-of-band" words);
   b. the encoding of video data is performed such that the in-band words are transition minimized (a sequence of in-band words has a reduced or minimized number of transitions);
   c. the encoding of video data is performed such that the in-band words are DC balanced (the encoding prevents each transmitted voltage waveform that is employed to transmit a sequence of in-band words from deviating by more than a predetermined threshold value from a reference potential. Specifically, the tenth bit of each "in-band" word indicates whether eight of the other nine bits thereof have been inverted during the encoding process to correct for an imbalance between running counts of ones and zeroes in the stream of previously encoded data bits);
2. the encoded video data and a video clock signal are transmitted as differential signals (the video clock and encoded video data are transmitted as differential signals over conductor pairs without the presence of a ground line);
3. three conductor pairs are employed to transmit the encoded video, and a fourth conductor pair is employed to transmit the video clock signal; and
4. signal transmission occurs in one direction, from a transmitter (typically associated with a desktop or portable computer, or other host) to a receiver (typically an element of a monitor or other display device).

It is foreseeable that a common use for encryption will be to encrypt video data for transmission over a serial link from a set-top box to a television, and it has been proposed to encrypt video data for transmission over a TMDS serial link (e.g., from a set-top box to a television). For example, it has been proposed to use the cryptographic protocol known as the "High-bandwidth Digital Content Protection" ("HDCP") protocol to encrypt digital video data to be transmitted over the "Digital Video Interface" ("DVI") link adopted by the Digital Display Working Group, and to decrypt the encrypted video data at the DVI receiver.

A DVI link can be implemented to include two TMDS links (which share a common conductor pair for transmitting a video clock signal) or one TMDS link, as well as additional control lines between the transmitter and receiver. We shall describe a DVI link (that includes one TMDS link) with reference to FIG. 1. The DVI link of FIG. 1 includes transmitter 1, receiver 3, and the following conductors between the transmitter and receiver: four conductor pairs (Channel 0, Channel 1, and Channel 2 for video data, and Channel C for a video clock signal), Display Data Channel ("DDC") lines for bidirectional communication between the transmitter and a monitor associated with the receiver in accordance with the conventional Display Data Channel standard (the Video Electronics Standard Association's "Display Data Channel Standard," Version 2, Rev. 0, dated Apr. 9, 1996), a Hot Plug Detect (HPD) line (on which the monitor transmits a signal that enables a processor associated with the transmitter to identify the monitor's presence), Analog lines (for transmitting analog video to the receiver), and Power lines (for providing DC power to the receiver and a monitor associated with the receiver). The Display Data Channel standard specifies a protocol for bidirectional communication between a transmitter and a monitor associated with a receiver, including transmission by the monitor of an Extended Display Identification ("EDID") message that specifies various characteristics of the monitor, and transmission by the transmitter of control signals for the monitor. Transmitter 1 includes three identical encoder/serializer units (units 2, 4, and 5) and additional circuitry (not shown). Receiver 3 includes three identical recovery/decoder units (units 8, 10, and 12) and interchannel alignment circuitry 14 connected as shown, and additional circuitry (not shown).

As shown in FIG. 1, circuit 2 encodes the data to be transmitted over Channel 0, and serializes the encoded bits. Similarly, circuit 4 encodes the data to be transmitted over Channel 1 (and serializes the encoded bits), and circuit 6 encodes the data to be transmitted over Channel 2 (and serializes the encoded bits). Each of circuits 2, 4, and 6 responds to a control signal (an active high binary control signal referred to as a "data enable" or "DE" signal) by selectively encoding either digital video words (in response to DE having a high value) or a control or synchronization signal pair (in response to DE having a low value). Each of encoders 2, 4, and 6 receives a different pair of control or synchronization signals: encoder 2 receives horizontal and vertical synchronization signals (HSYNC and VSYNC); encoder 4 receives control bits CTL0 and CTL1; and encoder 6 receives control bits CTL2 and CTL3. Thus, each of encoders 2, 4, and 6 generates in-band words indicative of video data (in response to DE having a high value), encoder 2 generates out-of-band words indicative of the values of HSYNC and VSYNC (in response to DE having a low value), encoder 4 generates out-of-band words indicative of the values of CTL0 and CTL1 (in response to DE having a low value), and encoder 6 generates out-of-band words indicative of the values of CTL2 and CTL3 (in response to DE having a low value). In response to DE having a low value, each of encoders 4 and 6 generates one of four specific out-of-band words indicative of the values 00, 01, 10, or 11, respectively, of control bits CTL0 and CTL1 (or CTL2 and CTL3).

As noted above, it has been proposed to use the cryptographic protocol known as the "High-bandwidth Digital Content Protection" ("HDCP") protocol to encrypt digital video to be transmitted over a DVI link and to decrypt the data at the DVI receiver. The HDCP protocol is described in the document "High-bandwidth Digital Content Protection System," Revision 1.0, dated Feb. 17, 2000, by Intel Corporation, and the document "High-bandwidth Digital Content Protection System Revision 1.0 Erratum," dated Mar. 19, 2001, by Intel Corporation. The full text of both of these documents is incorporated herein by reference.

A DVI transmitter implementing the HDCP protocol asserts a stream of pseudo-randomly generated 24-bit words, known as cout[23:0], during the video active period (i.e. when DE is high). Each 24-bit word of the cout data is "Exclusive Ored" (in logic circuitry in the transmitter) with a 24-bit word of RGB video data input to the transmitter, in order to encrypt the video data. The encrypted data are then encoded (according to the TMDS standard) for transmission. The same sequence of cout words is also generated in the receiver. After the encoded and encrypted data received at the receiver undergo TMDS decoding, the cout data are processed together with the decoded video in logic circuitry in order to decrypt the decoded data and recover the original input video data.

Before the transmitter begins to transmit HDCP encrypted, encoded video data, the transmitter and receiver communicate bidirectionally with each other to execute an authentication protocol (to verify that the receiver is authorized to receive protected content, and to establish shared secret values for use in encryption of input data and decryption of transmitted encrypted data). More specifically, each of the transmitter and the receiver is preprogrammed (e.g., at the factory) with a 40-bit word known as a key selection vector, and an array of forty 56-bit private keys). To initiate the first part of an authentication exchange between the transmitter and receiver, the transmitter asserts its key selection vector (known as "AKSV"), and a pseudo-randomly generated session value ("An") to the receiver. In response, the receiver sends its key selection vector (known as "BKSV") and a repeater bit (indicating whether the receiver is a repeater) to the transmitter, and the receiver also implements a predetermined algorithm using "AKSV" and the receiver's array of forty private keys to calculate a secret value ("Km"). In response to the value "BKSV" from the receiver, the transmitter implements the same algorithm using the value "BKSV" and the transmitter's array of forty private keys to calculate the same secret value ("Km") as does the receiver.

Each of the transmitter and the receiver then uses the shared secret value "Km," the session value "An," and the repeater bit to calculate a session key ("Ks") and two values ("M0" and "R0") for use during a second part of the authentication exchange. The second part of the authentication exchange is performed only if the repeater bit indicates that the receiver is a repeater, to determine whether the status of one or more downstream devices coupled to the repeater requires revocation of the receiver's authentication.

After the first part of the authentication exchange, and (if the second part of the authentication exchange is performed) if the receiver's authentication is not revoked as a result of the second part of the authentication exchange, each of the transmitter and the receiver generates a 56-bit frame key Ki (for initiating the encryption or decrypting a frame of video data), an initialization value Mi, and a value Ri used for link integrity verification. The Ki, Mi, and Ri values are generated in response to a control signal (identified as "ctl3" in FIG. 2), which is received at the appropriate circuitry in the transmitter, and is also sent by the transmitter to the receiver, during each vertical blanking period, when DE is low. As shown in the timing diagram of FIG. 2, the control signal "ctl3" is a single high-going pulse. In response to the Ki, Mi, and Ri values, each of the transmitter and receiver generates a sequence of pseudo-randomly generated 24-bit words cout [23:0]. Each 24-bit word of the cout data generated by the transmitter is "Exclusive Ored" (in logic circuitry in the transmitter) with a 24-bit word of a frame of video data (to encrypt the video data). Each 24-bit word of the cout data generated by the receiver is "Exclusive Ored" (in logic circuitry in the receiver) with a 24-bit word of the first received frame of encrypted video data (to decrypt this encrypted video data). The 24-bit words cout[23:0] generated by the transmitter are encryption keys (for encrypting a line of input video data), and the 24-bit words cout[23:0] generated by the receiver are decryption keys (for decrypting a received and decoded line of encrypted video data).

During each horizontal blanking interval (in response to each falling edge of the data enable signal DE) following assertion of the control signal ctl3, the transmitter performs a rekeying operation and the receiver performs the same rekeying operation to change (in a predetermined manner) the cout data words to be asserted during the next active video period. This continues until the next vertical blanking period, when the control signal ctl3 is again asserted to cause each of the transmitter and the receiver to calculate a new set of Ki and Mi values (with the index "i" being incremented in response to each assertion of the control signal ctl3). The Ri value is updated once every 128 frames. Actual encryption of input video data (or decryption of received, decoded video data) is performed, using the cout data words generated in response to the latest set of Ks, Ki and Mi values, only when DE is high (not during vertical or horizontal blanking intervals).

Each of the transmitter and receiver includes an HDCP cipher circuit (sometimes referred to herein as an "HDCP cipher") of the type shown in FIG. 3. The HDCP cipher includes linear feedback shift register (LFSR) module 80, block module 81 coupled to the output of LFSR module 80, and output module 82 coupled to an output of block module 81. LFSR module 80 is employed to re-key block module 81 in response to each assertion of an enable signal (the signal "ReKey" shown in FIG. 3), using the session key (Ks) and the current frame key (Ki). Block module 81 generates (and provides to module 80) the key Ks at the start of a session and generates (and applies to module 80) a new value of key Ki at the start of each frame of video data (in response to a rising edge of the control signal "ctl3," which occurs in the first vertical blanking interval of a frame). The signal "ReKey" is asserted to the FIG. 3 circuit at each falling edge of the DE signal (i.e., at the start of each vertical and each horizontal blanking interval), and at the end of a brief initialization period (during which module 81 generates an updated value of the frame key Ki) after each rising edge of signal "ctl3."

Module 80 consists of four linear feedback shift registers (having different lengths) and combining circuitry coupled to the shift registers and configured to assert a single output bit per clock interval to block module 81 during each of a fixed number of clock cycles (e.g., 56 cycles) commencing on each assertion of the signal "ReKey" when DE is low (i.e., in the horizontal blanking interval of each line of video data). This output bit stream is employed by block module 81 to re-key itself just prior to the start of transmission or reception of each line of video data.

Block module 81 comprises two halves, "Round Function K" and "Round Function B," as shown in FIG. 4. Round Function K includes 28-bit registers Kx, Ky, and Kz, seven S-Boxes (each a 4 input bit by 4 output bit S-Box including a look-up table) collectively labeled "S-Box K" in FIG. 4, and linear transformation unit K, connected as shown. Round Function B includes 28-bit registers Bx, By, and Bz, seven S-Boxes (each a 4 input bit by 4 output bit S-Box including a look-up table) collectively labeled "S-Box B" in FIG. 4, and linear transformation unit B, connected as shown. Round Function K and Round Function B are similar in design, but Round Function K performs one round of a block cipher per clock cycle to assert a different pair of 28-bit round keys (Ky and Kz) each clock cycle in response to the output of LFSR module 80, and Round Function B performs one round of a block cipher per clock cycle, in response to each 28-bit round key Ky from Round Function K and the output of LFSR module 80, to assert a different pair of 28-bit round keys (By and Bz) each clock cycle. The transmitter generates value An at the start of the authentication protocol and the receiver responds to it during the authentication procedure. The value An is used to randomize the session key. Block module 81 operates in response to the authentication value (An), and the initialization value (Mi) which is updated by output module 82 at the start of each frame (at each rising edge of the control signal "ctl3").

Each of linear transformation units K and B outputs 56 bits per clock cycle. These output bits are the combined outputs of eight diffusion networks in each transformation unit. Each diffusion network of linear transformation unit K produces seven output bits in response to seven of the current output bits of registers Ky and Kz. Each of four of the diffusion networks of linear transformation unit B produces seven output bits in response to seven of the current output bits of registers By, Bz, and Ky, and each of the four other diffusion networks of linear transformation unit B produces seven output bits in response to seven of the current output bits of registers By and Bz.

In Round Function K, one bit of register Ky takes its input from the bit stream asserted by module 80 when the ReKey signal is asserted. In Round Function B, one bit of register By takes its input from the bit stream asserted by module 80 when the ReKey signal is asserted.

Output module 82 performs a compression operation on the 28-bit keys (By, Bz, Ky and Kz) asserted to it (a total of 112 bits) by module 81 during each clock cycle, to generate one 24-bit block of pseudo-random bits cout[23:0] per clock cycle. Each of the 24 output bits of module 82 consists of the exclusive OR ("XOR") of nine terms as follows: (B0*K0)+ (B1*K1)+(B2*K2)+(B3*K3)+(B4*K4)+(B5*K5)+ (B6*K6)+(B7)+(K7), where "*" denotes a logical AND operation and "+" denotes a logical XOR operation. FIG. 5 specifies the input values B0-B7 and K0-K7 in the preceding expression for generating each of the 24 output bits of module 82. For example, FIG. 5 indicates that in order to generate output bit 0 (i.e., cout(0)), B0 is the seventeenth bit of register Bz, K0 is the third bit of register Kz, B1 is the twenty-sixth bit of register Bz, and so on.

In the transmitter, logic circuitry 83 (shown in FIG. 3) receives each 24-bit word of cout data and each input 24-bit RGB video data word, and performs a bitwise XOR operation thereon in order to encrypt the video data, thereby generating a word of the "data_encrypted" data indicated in FIG. 3. Typically, the encrypted data subsequently undergoes TMDS encoding before it is transmitted to a receiver. In the receiver, logic circuitry 83 (shown in FIG. 3) receives each 24-bit block of cout data and each recovered 24-bit RGB video data word (after the recovered data has undergone TMDS decoding), and performs a bitwise XOR operation thereon in order to decrypt the recovered video data.

Throughout the specification and in the claims the expression "TMDS-like link" will be used to denote a serial link, capable of transmitting digital video data (and a clock for the digital video data) from a transmitter to a receiver, and optionally also transmitting one or more additional signals (bidirectionally or unidirectionally) between the transmitter and receiver, that is or includes either a TMDS link or a link having some but not all of the characteristics of a TMDS link.

There are several conventional TMDS-like links. One type of TMDS-like link is the set of serial links known as Low Voltage Differential Signaling ("LVDS") links (e.g., "LDI," the LVDS Display Interface), each of which satisfies the TLA/EIA-644 standard or the IEEE-1596.3 standard. In each system including an LVDS link, the data are sent on a high-speed differential link with a synchronous clock. There is a single clock line with a four to three duty cycle and several different combinations of data lines depending on the data rate and bit depth. An LVDS link is a serial and differential video link, but the video data transmitted over an LVDS link is not encoded.

Other TMDS-like links encode input video data and other data to be transmitted into encoded words comprising more bits than the incoming data using a coding algorithm other than the specific algorithm used in a TMDS link, and transmit the encoded video data as in-band characters and the other encoded data as out-of-band characters. The characters need not be classified as in-band or out-of-band characters based according to whether they satisfy transition minimization and DC balance criteria. Rather, other classification criteria could be used. An example of an encoding algorithm, other than that used in a TMDS link but which could be used in a TMDS-like link, is IBM 8b10b coding. The classification (between in-band and out-of-band characters) need not be based on just a high or low number of transitions. For example, the number of transitions of each of the in-band and out-of-band characters could (in some embodiments) be in a single range (e.g., a middle range defined by a minimum and a maximum number of transitions).

The data transmitted between the transmitter and receiver of a TMDS-like link can, but need not, be transmitted differentially (over a pair of conductors). Although the differential nature of TMDS is important in some applications, it is contemplated that some TMDS-like links will transmit data other than differential data. Also, although a TMDS link has four differential pairs (in the single pixel version), three for video data and the other for a video clock, a TMDS-like link could have a different number of conductors or conductor pairs.

The primary data transmitted by a TMDS link are video data. What is often significant about this is that the video data are not continuous, and instead have blanking intervals. However, many TMDS-like serial links do not transmit data having blanking intervals, and thus do not encode input data (for transmission) in response to a data enable signal. For example, the audio serial links known as I²S and S/PDIF transmit continuous data.

We shall refer to content protection protocols other than the HDCP protocol as "non-HDCP" protocols. Not only content protection protocols that closely resemble the HDCP protocol (but differ therefrom in one or more respects), but also content protection protocols very different from the HDCP protocol, shall be referred to as "non-HDCP protocols."

Aspects of the present invention are useful in encrypting and/or decrypting data in accordance with the HDCP protocol. Some such aspects are also useful in encrypting and/or decrypting data in accordance with non-HDCP protocols. Other aspects of the present invention are useful in encrypting and/or decrypting data in accordance with non-HDCP protocols but not in accordance with the HDCP protocol.

FIG. 6 is a block diagram of the functions performed to encrypt (or decrypt) data in a class of typical non-HDCP protocols that can be implemented in accordance with the present invention. The key exchange function of FIG. 6 is responsible for producing a "key" (which is effectively a large, unique number) for use in generating pseudo-random numbers. Generally speaking, it is necessary to produce the same key at both sides of the link (e.g., at both a transmitter which encrypts data and at a receiver which decrypts the encrypted data), so that pseudo-random number generator (PRNG) functions on both sides of the link can have the same seed, and thus produce the same pseudo-random value stream in response to the same seed. There are many ways to perform a key exchange function. A small number of keys can be pre-programmed for later use, but this is cumbersome and severely limits flexibility (and/or security). Keys can be generated (e.g., in both a transmitter and a receiver) in accordance with a predetermined algorithm, with or without external "seeds," but security will be compromised if the details of the algorithm become publicly known or are reverse-engineered.

Alternatively, a key (or sequence of keys) can be generated elsewhere and delivered to both sides of the link. If each key can be delivered securely to both sides of the link, the protocol will closely approximate a "one-time-pad", which is the only truly perfect cipher. There are many ways to deliver keys: one employs an external data entry system such as a password, bar code, or smart card; another employs a private and very secure channel between the transmitter and recipient of the key; and another employs a trusted third party (such as a "certificate authority").

It should be appreciated that when the expression "certificate authority" is used herein, it is used in a broad sense to denote a trusted third party having the capability to perform a particular function, where such function is described in the context in which the expression "certificate authority" is used. The expression "certificate authority" is more commonly used in a narrower sense to denote a trusted third-party agent that issues digital certificates that are used to create or verify digital signatures and public-private key pairs, where the role of such trusted third-party agent is to guarantee that the individual granted the unique certificate is, in fact, who he or she claims to be. Usually, this means that the certificate authority (where this expression is used in its narrower sense) has access to some specific information (delivered or maintained separately) that allows it to confirm an individual's claimed identity.

The key exchange function of FIG. 6 can implement combinations of two or more key exchange mechanisms. The key exchange mechanism used could vary with the application, or the type of content, or the desired use. Or multiple key exchange methods could be used in concert, each delivering some portion of the key. This latter approach has a number of advantages. For example, if one portion of the system fails and a corresponding portion of the key is compromised, overall system security can still be maintained.

Once each side of the link has the key, the key is used to seed a PRNG function (shown in FIG. 6). The PRNG function can be implemented in any of many different ways, most of which fall into two classes: "stream" ciphers; and "block" ciphers. The best choice for implementing the PRNG function depends on the kind of data, how the data is organized, and how much of it there is. A stream cipher is essentially designed to handle streams of bits (or words). Stream ciphers are fast and efficient, but also generally less secure. Block ciphers are designed to handle blocks of data (data organized into large chunks). They tend to be slower and more compute-intensive, but are generally more secure.

The reversible function (indicated as a separate block of FIG. 6) combines the input data values with the pseudo-random numbers generated by the PRNG function, and is reversible in the sense that data encrypted by a first pass through the reversible function will be decrypted (restored to its original state) by undergoing a second pass through the reversible function. It is not strictly necessary to implement the reversible function as a separate block, because either a stream or a block cipher (implementing the PRNG function, and coupled to receive the input data) will often incorporate the functionality of the reversible function block of FIG. 6. The PRNG and reversible function blocks are separated in FIG. 6 for clarity, and because implementing them separately allows the system to have greater flexibility in attaining the desired level of security.

There are many choices for the cipher algorithm implemented by the reversible function, both standardized and proprietary. Examples include DES, Triple DES, and the Advanced Encryption Standard (AES) or any of the AES candidate algorithms. The exact choice will depend on the costs and goals.

The synchronization function is implemented in a manner which depends on whether each side of the link works in unison (or in contrast, whether encryption and decryption occurs at different times), it determines when the reversible function begins to encrypt (or decrypt) data, and it typically also monitors whether the encryption (or decryption) process is working properly.

In cryptography, encryption and decryption most often occur at different times (we will call this "asynchronous" operation). Asynchronous operation requires that some kind of synchronization information is included in the message sent over the link. This can be as simple as designation of where the message starts, or can include special characters or sub-messages. "Instantaneous" links (or those with known or predictable delays) can operate asynchronously, or they can be implemented so that the encryption and decryption occur at the same time in the logical sense (we will call this "synchronous" operation). Synchronous operation uses some mutual, external time reference that signals both sides when to start. DVI links (and TMDS links) are capable of either synchronous or asynchronous operation. Synchronous timing can work in any of several ways, including by prior arrangement (e.g., both sides of the link can use the first full vertical sync pulse as the reference) or by a handshake of some sort (e.g., the link can exchange information and agree that the next sync pulse will be the reference). The handshake can be accomplished by exchanging signals as simple as a single dedicated pulse, a predefined bit location, or other electrical signal. Or it can be accomplished by exchanging signals that are more accurately distinguishable, such as actual messages (collection of bits), pulse-trains or other more complex electrical signals, or combinations of pulses or signals (e.g., on different wires or time slots).

Typically, some re-synchronization method (e.g., periodic re-synchronization) will be necessary and useful. There are at least two different ways to re-synchronize. One includes delivery of new key material to each side, and then reaching a new agreement about when it will be used. Another involves saving "checkpoints" (copies of the system state when the synchronization is known or assumed to be good) and then going back to the last checkpoint when necessary. These and other re-synchronization methods are not mutually exclusive. Indeed, often a combination of approaches or capabilities gives the best performance.

A typical non-HDCP protocol also implements link verification, typically as part of the synchronizing function. Link verification is typically done both to verify that the link is operating properly (and does not need some special intervention), and because some outside agent wishes to verify compliance with some set of rules. Link verification preferably occurs on a continual basis. A compromise is to perform link verification at regular intervals. If the latter approach is used the interval must be short to limit the inconvenience a link break would cause, and to narrow the window of opportunity for any "hacker."

SUMMARY OF THE INVENTION

In a class of embodiments, the invention is a communication system including a transmitter, a receiver, and a serial link (e.g., a TMDS-like link) in which data (e.g., video data or audio data) are encrypted, the encrypted data are transmitted from the transmitter to the receiver, and the transmitted data are decrypted in the receiver. Other aspects of the invention are transmitters and receivers for use in such systems, cipher engines for use in such transmitters or receivers, encryption and decryption methods, and methods for authenticating receivers prior to transmission of encrypted data to such receivers over a serial link.

A transmitter, receiver, or cipher engine (for use in a transmitter or receiver) for use in such a system, and which is configured to implement a content protection protocol in accordance with the present invention, is configured to implement at least one and preferably more than one (e.g., as many as practical) of the attack prevention features disclosed herein. Such attack prevention features include the following:

where the protocol requires that each of the transmitter and receiver send a distinctive value (e.g., an AKSV value of the type sent by a transmitter, or a BKSV value of the type sent by a receiver, during the authentication procedure of the HDCP protocol) to the other of the transmitter and receiver during an authentication procedure, at least one of the transmitter and the receiver is configured to compare its own distinctive value with the distinctive value sent to it during the authentication procedure, and to prevent authentication from succeeding if the two distinctive values are equal. Optionally, each of the transmitter and receiver is configured to compare its own distinctive value with the distinctive value sent to it during the authentication procedure, and to prevent the authentication from succeeding if the two distinctive values are equal. In variations on this technique in which the distinctive values are sent to a third party agent (a device coupled to the transmitter and receiver), the agent is configured to compare the distinctive values and to prevent authentication from succeeding if the compared values are equal;

where the protocol requires that each of the transmitter and receiver store a set of private keys, and process the private keys together with a value received from the other of the transmitter and the receiver to generate a shared secret, at least one of the transmitter and receiver is configured to check that the private keys that it is processing (or will process) to generate the shared secret satisfy at least one predetermined criterion, and to abort the process of generating the shared secret if said private keys do not satisfy each said criterion. For example, the criterion can be that the private keys do not consist entirely of ones or entirely of zeroes. For another example, the criterion can be that the private keys do not consist entirely of ones, entirely of zeroes, or of any of at least one other simple or regular pattern (such as a pattern of alternating ones and zeros). Alternatively, at least one of the transmitter and receiver is configured to be coupled to an external agent to send to the external agent the private keys to be processed to generate the shared secret (or, rather than sending the keys themselves, information indicative of some characteristic of the keys, such as a digital signature of the keys, or a request for verification of keys, is sent to the agent). The external agent is configured to check that the private keys satisfy at least one predetermined criterion (or otherwise to verify the private keys stored in the transmitter or receiver, or to send information to the transmitter or receiver that enables the transmitter or receiver to verify the private keys) and to cause the relevant one of the transmitter and the receiver to abort the process of generating the shared secret if the private keys do not satisfy each said criterion (or are otherwise not verified). Alternatively, at least one of the transmitter and receiver stores encrypted private keys and is configured to be coupled to an external agent to request information needed to decrypt the keys, and the external agent is configured to respond to such a request to send the necessary information for decrypting the stored, encrypted private keys;

where the protocol requires that each of the transmitter and receiver store a set of private keys, and process the private keys together with a value received from the other of the transmitter and the receiver to generate a shared secret, at least one of the transmitter and receiver is configured to store the private keys in a read-only memory (where the expression "read-only memory" is used to denote a memory in a class including read-only memories and write-once memories). Preferably also each of the transmitter and receiver is configured so that it cannot be operated in a mode in which substitute private keys are loaded into shared secret generation circuitry thereof in place of private keys from the read-only or write-once memory. Preferably also, each private key memory is configured so that the private keys stored therein cannot be read if said memory is removed from the transmitter or receiver in which it is installed;

where the protocol requires that each of the transmitter and receiver send a distinctive value (e.g., an AKSV value of the type sent by a transmitter, or a BKSV value of the type sent by a receiver, during the authentication procedure of the HDCP protocol) to the other of the transmitter and receiver during an authentication procedure, the receiver is configured to check the distinctive value that it receives during the authorization procedure satisfies at least one predetermined criterion, and to prevent authorization from succeeding if said distinctive value does not satisfy each said criterion. Preferably, in cases in which the protocol is the HDCP protocol, at least one of the transmitter and receiver (and preferably both of the transmitter and receiver are) is configured to check the distinctive value that it receives (from the other of said transmitter and said receiver) during the authorization procedure satisfies at least one additional predetermined criterion beyond each criterion specified by the HDCP protocol, and to prevent authorization from succeeding if said distinctive value does not satisfy each said additional criterion;

where the protocol requires that the transmitter and receiver successfully complete an authentication exchange before the transmitter sends encrypted data to the receiver, at least one of the transmitter and the receiver is configured with lockout means configured to prevent successful completion of an authentication exchange between the receiver and the transmitter in the event that an authorization request is received at said one of the transmitter and the receiver within a predetermined time window after a predetermined number of authentication requests have been received at said one of the transmitter and the receiver;

where the protocol requires that each of the transmitter and receiver store a set of private keys and process the private keys together with a value received from the other of the transmitter and the receiver to generate a shared secret, each of the transmitter and the receiver is configured to generate the shared secret as a shared secret value consisting of more than 56 bits. Preferably, each of the transmitter and the receiver includes a block module having six registers capable of receiving a total of 168 parallel bits, the block module is a conventional HDCP-compliant block module, and said each of the transmitter and the receiver is configured to implement a modified version of the HDCP protocol using the block module to generate the shared secret value so that said shared secret value consists of more than 56 bits but less than 104 bits;

where the protocol requires that each of the transmitter and receiver store a set of private keys and process the private keys together with a value received from the other of the transmitter and the receiver to generate a shared secret, each of the transmitter and the receiver is configurable so as to generate a first shared secret and is reconfigurable so as to generate a second shared secret different than the first shared secret. In some such embodiments, each of the transmitter and the receiver is configured to be coupled to an external agent and to become reconfigured so as to generate said second shared secret in response to values asserted thereto by the external agent. In other ones of such embodiments, each of the transmitter and the receiver stores at least two selectable sets of private keys, and a different one of the selectable sets is selected during configuration and reconfiguration of each of the transmitter and the receiver;

where the protocol requires that each of the transmitter and receiver successfully complete an authentication exchange before the transmitter sends encrypted data to the receiver, the transmitter and the receiver exchange values during a first portion of the authentication exchange, and upon successful completion of the first portion of the authentication exchange, but only if the receiver is a repeater, the receiver sends authentication data to the transmitter during a second portion of the authentication exchange, wherein the authentication data is indicative of whether any unauthorized device is coupled to the receiver downstream from said receiver but is not indicative of any unencrypted value generated by the receiver during the first portion of the authentication exchange in response to the values sent to the receiver by the transmitter in the first portion of the authentication exchange. For example, in cases in which the initialization values sent by the transmitter include a key selection vector "KSV" and a pseudo-random value "An," and in which the receiver generates a shared secret and an "M0" value during the first portion of the authentication exchange, the authentication data includes a list of key selection values of downstream devices but is not indicative of the shared secret or the "M0" value;

where the protocol requires that the transmitter (or another entity) send a pseudo-randomly generated value to the receiver (e.g., an "An" value of the type sent by a transmitter during the authentication procedure of the HDCP protocol) before sending encrypted data to the receiver, the transmitter (or other entity) is configured to generate the pseudo-randomly generated value in a manner employing a gaussian analog effect. For example, the transmitter (or other entity) is configured to employ a diode-based white noise source to generate the pseudo-randomly generate value, or the transmitter (or other entity) is configured to employ an R-C oscillator to generate the pseudo-randomly generate value;

where the protocol requires that the transmitter send a pseudo-randomly generated value to the receiver (e.g., an "An" value of the type sent by a transmitter during the authentication procedure of the HDCP protocol) before sending encrypted data to the receiver, the transmitter is configured so that it is not operable in any mode that allows substitution of an externally determined value for the pseudo-randomly generated value followed by transmission to the receiver of encrypted data that has been encrypted in a manner determined by the externally determined value;

the transmitter is configured to detect whether a data stream being input thereto for encryption is an encrypted stream, and to encrypt the data stream only if said stream is not determined to be an encrypted stream;

the transmitter is configured to detect whether a data stream being input thereto for encryption is data indicative of plain text (i.e., indicative of any of one or more simple, predetermined patterns of values, for example, patterns consisting entirely of black values or white values), and to encrypt the data stream only if said stream is not determined to be indicative of plain text;

wherein the protocol requires that the receiver generate updated values with predetermined timing during decryption of encrypted data (e.g., the "Ri" values generated by a receiver implementing the HDCP protocol), the transmitter is configured to continue transmission of encrypted data only after determining that the receiver is generating the updated values with the predetermined timing;

the protocol is implemented to require that the receiver transmit status information with predetermined timing (and optionally in encrypted form) to the transmitter during decryption of encrypted data (e.g., the "Ri" values generated by a receiver implementing the HDCP protocol), the transmitter is configured to continue transmission of encrypted data only after determining that the receiver has transmitted appropriate status information with the predetermined timing;

where the transmitter is configured to execute a re-authentication exchange with a receiver in response to predetermined circumstances following successful completion of an initial authentication exchange with the receiver, the transmitter is configured to not to transmit non-degraded unencrypted data during the re-authentication exchange, or to transmit non-degraded unencrypted data only for a limited time commencing during each said re-authentication exchange. For example, the transmitter can be configured to transmit only degraded (reduced quality) unencrypted data during the re-authentication exchange, or to black out at least some of any unencrypted data transmitted during the re-authentication exchange; and the transmitter includes tamper protection circuitry configured to detect unauthorized capture of an unencrypted data signal present at an input of said transmitter, and the receiver includes tamper protection circuitry configured to detect unauthorized capture of a decrypted data signal present at an output of said receiver. Such circuitry can include a threshold detector that looks for unusual signal reflections, line impedance or capacitance values, or voltage levels, or another indication of unauthorized signal diversion.

In a class of embodiments, the invention is a method for implementing a content protection protocol to encrypt data, said method including the steps of:

determining combinations of private key sets and key selection vectors, such that each of the private key sets together with one of the key selection vectors and a predetermined algorithm determines a shared secret; and storing one of the private key sets and one of the key selection vectors in each of a set of transmitters and receivers, such that each of the transmitters together with any one of the receivers stores one of the combinations of private key sets and key selection vectors that determines the shared secret, but such that analysis of data encrypted by the set of transmitters and receivers, together with the private key sets and the key selection vectors stored in the set of transmitters and receivers, cannot determine which one of the private key sets will generate the shared secret when processed with any known one of the key selection vectors in accordance with the algorithm.

In another class of embodiments, the invention is a method for implementing a content protection protocol to encrypt data, said method including the steps of: determining combinations of private key sets and key selection vectors, such that each of the private key sets together with one of the key selection vectors and a predetermined algorithm determines a shared secret; and generating encrypted private key sets and encrypted key selection vectors by encrypting the private key sets and key selection vectors and delivering the encrypted private key sets and the encrypted key selection vectors to a facility. The encrypted private key sets and encrypted key selection vectors are decrypted at the facility to recover the private key sets and the key selection vectors, and one of the private key sets and one of the key selection vectors stored in each of a set of transmitters and receivers at the facility. Or, one of the encrypted private key sets and one of the encrypted key selection vectors is stored in each of a set of transmitters and receivers at the facility, the transmitters and receivers are then distributed (e.g., to end-users), and thereafter the encrypted private key set and encrypted key selection vector stored in each distributed device are decrypted (e.g., when an end-user causes a transmitter or receiver to be coupled to an external agent, such as during a registration process, and the external agent decrypts the encrypted private keys and encrypted key selection vector or cooperates with the transmitter or receiver to accomplish such decryption).

In other embodiments, the invention is a system including transmitters and receivers configured to implement a content protection protocol, wherein the protocol requires that each of the receivers send authorization data to one of the transmitters during an authentication procedure, and the protocol requires each of the transmitters to prevent successful completion of the authorization procedure with one of the receivers when the authorization data sent to said by said one of the receivers includes a revocation value, wherein the system also includes:

an agent which stores a revocation list including each said revocation value, wherein at least one of the transmitters is configured to be coupled to the agent for forwarding to the agent at least a portion of the authorization data received from one of the receivers, and wherein the agent is configured to check whether the authorization data forwarded to said agent is indicative of any revocation value included in the revocation list.

Preferably, a transmitter or receiver configured to implement a content protection protocol in accordance with the present invention is configured to implement more than one (and preferably as many as practical) of the attack prevention features disclosed herein. The described embodiments are, in general, not exclusive, and in some applications the best performance will be achieved when using some combination of these approaches.

BRIEF DESCRIPTION OF THE DRAWINGS

FIG. 5 is a table of values employed by module 82 of FIG. 3 to operate on the values asserted thereto by module 81.

DETAILED DESCRIPTION OF THE PREFERRED EMBODIMENTS

Figure 1:
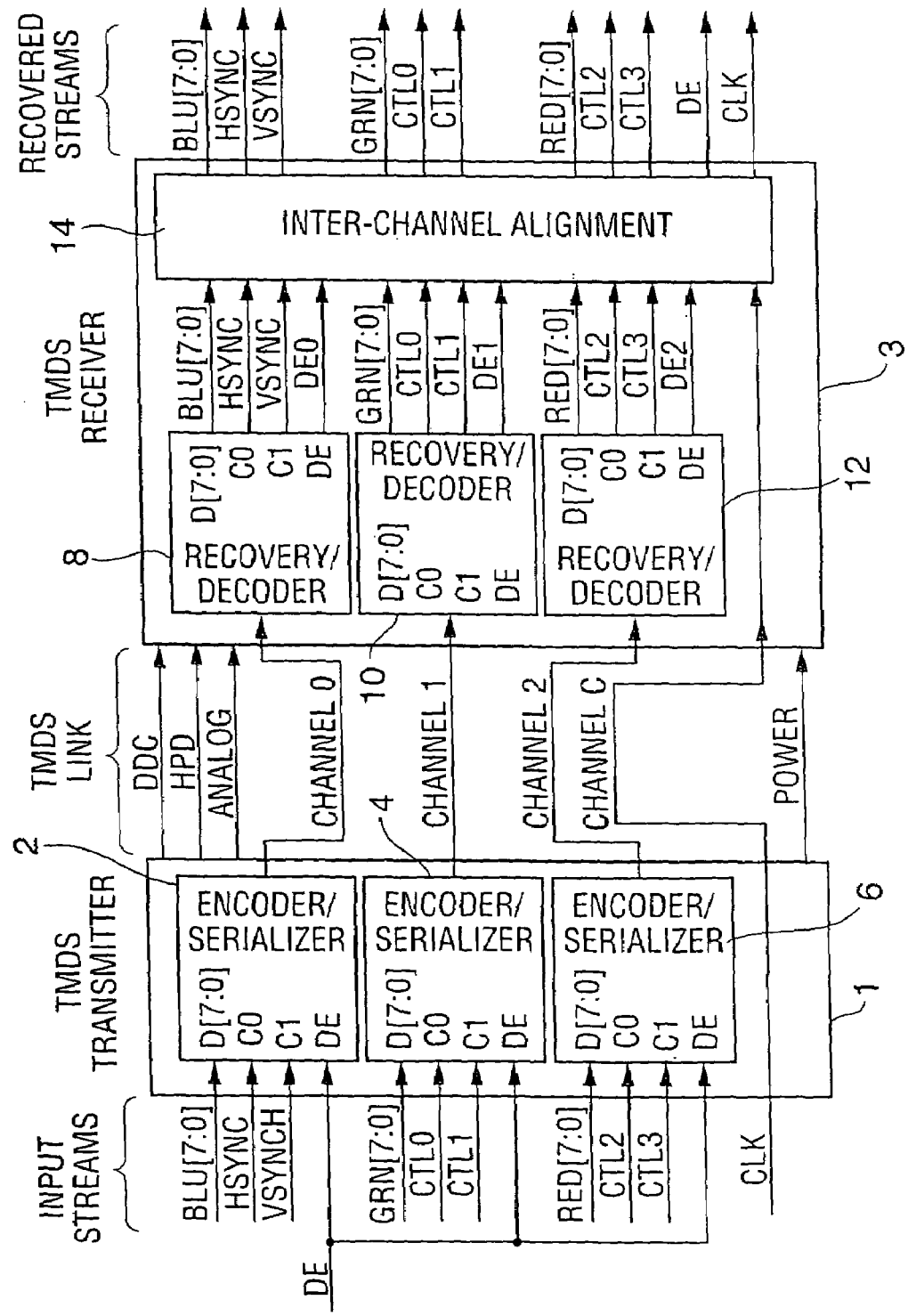
FIG. 1 is a block diagram of a conventional system including a Digital Video Interface ("DVI") link.

It should be appreciated that the term "transmitter" is used herein in a broad sense to denote any unit capable of transmitting data over a serial link (and optionally also encoding and/or encrypting the data to be transmitted), and the term "receiver" is used herein in a broad sense to denote any unit capable of receiving data that has been transmitted over a serial link (and optionally also decoding and/or decrypting the received data). The link can, but need not, be a TMDS-like link. For example, the term transmitter can denote a transceiver that performs the functions of a receiver as well as the functions of a transmitter.

In another example, the term "transmitter" denotes a processor programmed with software for implementing an "upstream" variation on the HDCP protocol to communicate with a graphics controller (with the graphics controller functioning as a "receiver"). Such a processor can send video data to the graphics controller after executing an authentication exchange (in accordance with the "upstream" version of the HDCP protocol). The processor and graphics controller can be elements of a personal computer configured to send encrypted video data from the graphics controller to a display device. The graphics controller and display device can be configured to execute another encryption protocol (e.g., the above-discussed HDCP protocol, which can be referred to in this context as the "downstream" HDCP protocol) to allow the graphics controller (this time functioning as a "transmitter") to encrypt video data and send the encrypted video to the display device, and to allow the display device (functioning as a "receiver") to decrypt the encrypted video.

We shall use the abbreviation "KSV" herein to denote "key selection vector."

In some content protection protocols, including the HDCP protocol and some non-HDCP protocols, each of the transmitter and receiver generates a shared secret during an authentication exchange (in which the cipher engines of the transmitter and receiver are also aligned). The transmitter does so by processing a first KSV (where the first KSV is sent to the transmitter by the receiver or by an external agent) in accordance with a predetermined algorithm, and the receiver does so by processing a second KSV (where the second KSV is sent to the receiver by the transmitter or an external agent) in accordance with the same algorithm, where each of the first KSV and second KSV is a member of a set of KSV values. During the process of manufacture or configuration, one of the KSV values in this set is stored in each transmitter and receiver intended to be capable of encrypting or decrypting data. Such protocols have a weakness in that they are vulnerable to a variety of attacks. Among such attacks are:

those in which a system or device (an "attacker") causes both a transmitter and a receiver to use the same KSV (the KSV stored in the transmitter, or the KSV stored in the receiver) to generate the shared secret;

those in which an attacker emulates an authorized receiver, the attacker causes a transmitter to use its own KSV (i.e., the KSV stored in the transmitter) to generate the shared secret, and the attacker uses the same KSV (the KSV stored in the transmitter) to generate the shared secret; and those in which the attacker learns the KSV stored in an authorized transmitter, and the attacker sends this KSV to the transmitter during the appropriate part of an authentication exchange, thus causing the transmitter to use its own KSV (received from the attacker) to generate the shared secret.

Such attacks can be prevented in accordance with a first class of embodiments of the invention by configuring the transmitter to compare its own KSV value with the KSV value sent to it by the receiver (or the attacker) during the authentication exchange, to allow the authentication process to proceed if the two KSV values are not equal, and to prevent the authentication from succeeding if the two KSV values are equal. In the alternative, or in addition, another device is configured to perform these operations. To prevent those of the attacks that use an authorized receiver, the receiver is configured to compare its own KSV value with the KSV value sent to it (e.g., by the attacker) during the authentication exchange, to allow the authentication process to proceed if the two KSV values are not equal, and to prevent the authentication from succeeding if the two KSV values are equal. In the alternative, or in addition, another device is configured to perform these operations. The operations of comparing the KSV values, allowing the authentication process to proceed if the KSV values are not equal, and preventing the authentication from succeeding if the KSV values are equal can be implemented either in hardware or in software, and at either side or both sides of the link. For example, not only the transmitter but also a device (e.g., the receiver) on the other side of the link can be configured with hardware for comparing the KSV value sent in one direction over the link (by the transmitter) with a KSV value sent in the other direction over the link (by the receiver or the attacker) during the authentication exchange, allowing the authentication process to proceed if the two KSV values are not equal, and aborting the authentication process if the two KSV values are equal.

Figure 3:
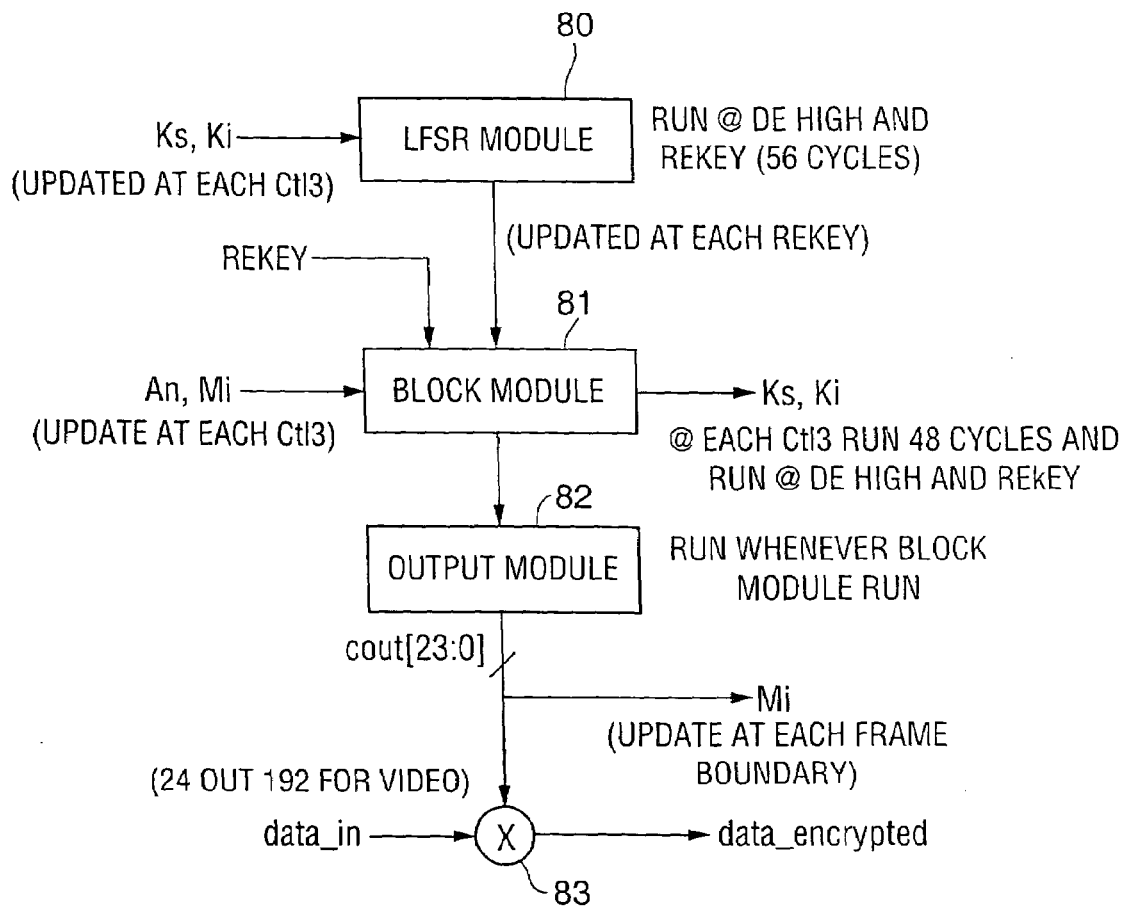
FIG. 3 is a block diagram of conventional circuitry for encrypting digital video data to be transmitted over a DVI link.
Figure 7:
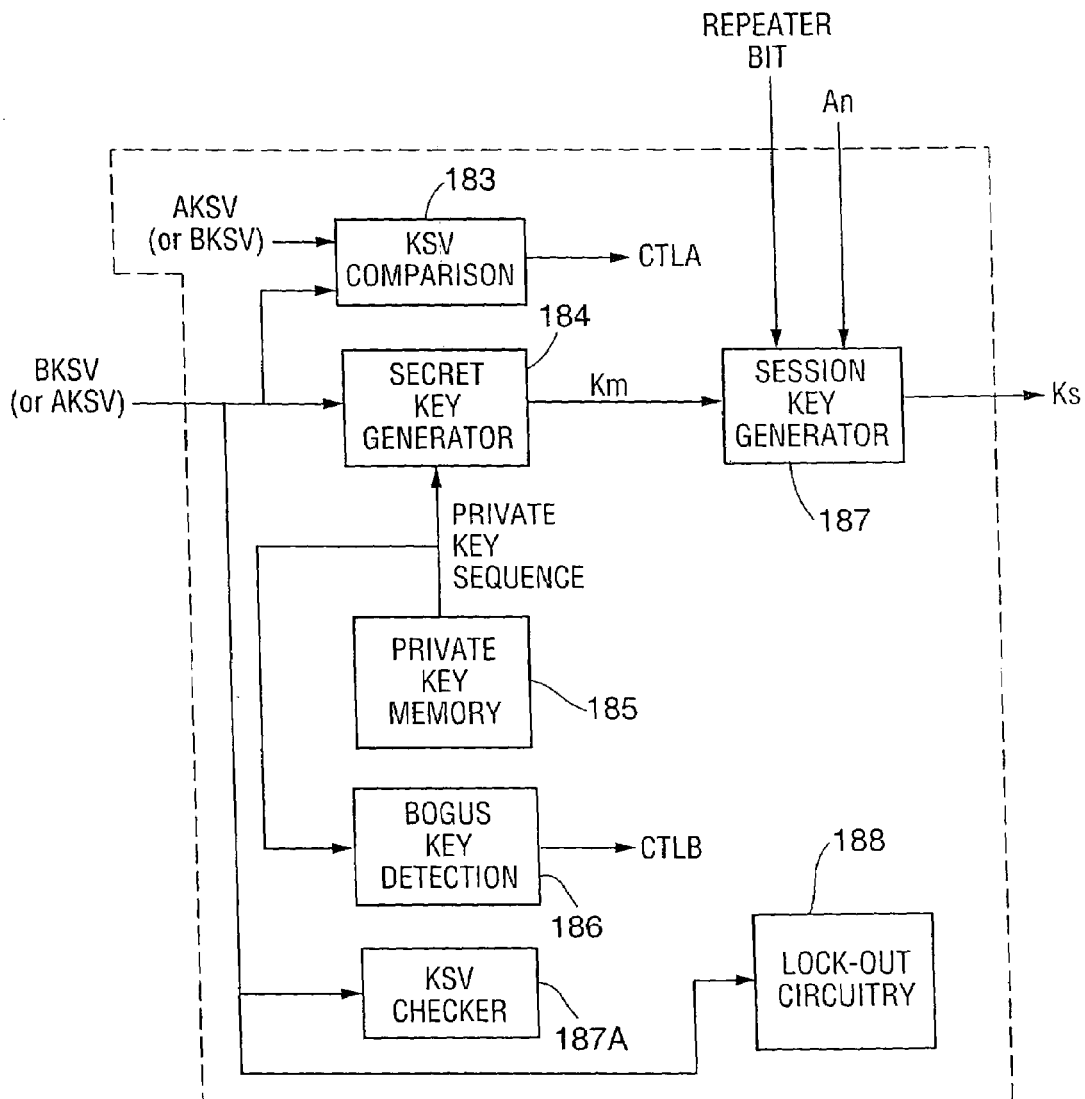
FIG. 7 is a block diagram of features of a modified version of module 81 of FIG. 3, which embodies the invention.

Block module 181 of FIG. 7 is a modified version of conventional block module 81 of FIG. 3. Block module 181 performs the functions of block module 81, but differs from block module 81 in that it is configured also to perform additional functions in accordance with the invention. Private key memory 185 stores the above-mentioned set of forty 56-bit private keys. When block module is implemented in a transmitter, secret key generator 184 generates secret value "Km" (at a time following successful completion of a verification exchange with a receiver), in response to the 40-bit word key selection vector ("BKSV") received from the receiver and a sequence of the private keys read from memory 185. In response to the secret value "Km," the above-mentioned session value "An," and the above-mentioned repeater bit, session key generator 187 generates the session key "Ks." Block module 181 also includes comparison logic 183 which compares the key selection vector "BKSV" (the 40-bit key selection vector sent to the transmitter, by a valid receiver or an attacker, during the authentication exchange) with the key selection vector ("AKSV") internal to the transmitter. Comparison logic 183 asserts control signal CTLA as a result of this comparison. The transmitter is configured to abort an authentication exchange (and prevent transmission of encrypted data to the receiver) in response to the signal CTLA when the signal CTLA indicates that the AKSV and BKSV values are equal.

Of course, when block module 181 is implemented in a receiver, it receives a 40-bit word key selection vector ("AKSV") from the transmitter during an authentication exchange, and logic 183 compares this value with the distinctive selection vector ("BKSV") internal to the receiver.

A subset of the systems that are vulnerable to the above-described "copied KSV" attack are also vulnerable to another attack to be referred to herein as a "bogus key" attack. This subset of systems are those in which the predetermined algorithm (according to which both the transmitter and receiver process the received KSV value to generate a shared secret) generates the shared secret by performing a logical operation whose input values are the KSV value and a set of private keys. In the "bogus key" attack, a system or device (the attacker) is configured to copy to both the receiver and transmitter an identical set of "bogus" private keys, to respond to transmission of a KSV from the transmitter to the receiver by returning this KSV to the transmitter during the appropriate part of the authentication exchange, thereby causing both the receiver and transmitter to generate a common shared secret by processing the same KSV value using the same set of bogus private keys. In another version of the "bogus key" attack, the attacker is configured to emulate a receiver as follows: the attacker is configured to implement the predetermined algorithm, using a set of "bogus" private keys (rather than a valid set of private keys), the attacker is configured to copy to the transmitter the set of "bogus" private keys (to replace a valid set of private keys with which the transmitter was originally programmed), the attacker is configured to respond to transmission of a KSV from the transmitter to the receiver by returning this KSV to the transmitter during the appropriate part of the authentication exchange (thereby causing the transmitter to generate a secret by processing its own KSV value using the bogus private keys), and the attacker is configured to perform the predetermined algorithm using the bogus private keys and the KSV received from the transmitter to generate the same secret (a "shared" secret) as does the transmitter. As a result of either version of the "bogus key" attack, both the attacker and transmitter generate the same shared secret, and the attacker uses the shared secret to decrypt encrypted data that it subsequently receives from the transmitter.

In the case that the system being attacked is one implementing the HDCP protocol, nearly any valid KSV can be processed (with any of several sets of simple bogus keys) to generate a useful shared secret. For example, if each of the bogus keys consists of all ones or all zeroes, then almost any valid KSV can be processed with such bogus keys to generate a useful shared secret.

A "bogus key" attack can be prevented in accordance with the present invention by configuring the transmitter and/or receiver to check that the private keys that it is (or they are) processing or will process (with a KSV value received from the other side of the link to generate a shared secret) satisfy at least one predetermined criterion. Each such transmitter or receiver is also configured to abort the process of generating the shared secret if the private keys that it is processing (or will process) do not satisfy each such criterion. For example, the criterion can be that the private keys do not consist entirely of ones, entirely of zeroes, or of alternating or other regular patterns. Or, the criterion can be that private keys have other specific mathematical properties (such as maximum run-lengths). In the FIG. 7 embodiment, bogus key detection logic 186 is coupled to receive each of the private keys read sequentially out of memory 185. In order to block a bogus key attack in which an attacker has written a set of bogus keys into memory 185, logic 186 is configured to determine whether each of the private keys read from memory 185 satisfies a predetermined criterion (e.g., to determine whether any of the keys consists entirely of ones or zeroes), and to assert a control signal CTLB indicative of whether any of the private keys fails to satisfy this criterion. The transmitter is configured to prevent secret key generator 184 from generating the secret value Km if control signal CTLB indicates that at least one of the private keys has failed to satisfy the criterion.

A "bogus key" attack can also be prevented in accordance with the present invention by configuring the transmitter and/or receiver so that each private key memory thereof (e.g., memory 185 of FIG. 7) is a "read-only" or "write-once" memory so that a set of valid private keys can be stored therein only once (e.g., at the factory). Alternatively (or additionally), each private key memory is protected against access by an attacker by physical means or suitably strong cryptographic means. Also alternatively (or additionally), the transmitter (and/or receiver) is (are) implemented to prevent it (them) from being operated in a test (or other) mode that that allows substitute private keys to be loaded into its (their) shared secret generation circuitry (e.g., into circuit 184 of FIG. 7) in place of private keys from a "read-only" or "write-once" memory therein. Each transmitter and receiver is preferably also implemented so that it is not possible to physically copy stored private keys from one transmitter or receiver to another transmitter or receiver. For example, each transmitter and receiver is preferably implemented so that it is not possible to remove therefrom an EEPROM or other memory (e.g., memory 185 of FIG. 7) containing private keys, copy the private keys, and install the copy in another device.

A "bogus key" attack can also be prevented in accordance with the present invention by employing a trusted third-party agent (e.g., a "certificate authority" or registration agent) to verify the validity of a set of private keys being processed or to be processed (with a KSV value) by a transmitter or receiver to generate a shared secret. At least one of the transmitter and receiver can be configured to be coupled to the agent to send to the agent the private keys to be processed to generate the shared secret. The external agent can implement a hash algorithm (or other suitable technique) to verify each such private key set against a suitable database. Or, rather than sending the private keys themselves to the agent, the transmitter or receiver (or both) can send information indicative of some characteristic of the keys (such as a digital signature of the keys) to the agent. In either case, the external agent is configured to check that the private keys satisfy at least one predetermined criterion (or otherwise to verify the private keys stored in the transmitter or receiver) and to cause said one of the transmitter and the receiver to abort the process of generating the shared secret if said private keys do not satisfy each said criterion (or are otherwise not verified). Alternatively, at least one of the transmitter and receiver stores encrypted private keys and is configured to be coupled to an external agent to request information needed to decrypt the keys, and the external agent is configured to respond to such a request to send the necessary information for decrypting the stored, encrypted private keys. Any of the various methods for third-party verification (of private keys) can occur on-the-fly (if the third-party agent is a device connected over a network with the transmitter or receiver), or it can be accomplished once (e.g., prior to a first use of the transmitter or receiver). For example, if the transmitter is a set-top box configured to transmit encrypted video to a television set receiver, the set-top box can dial-in once (e.g., at installation time) to verify its private keys and register a hash. Preferably, each transmitter (or receiver) is configured to detect any change in the private keys stored in memory therein, and to require re-verification of each new set of private keys replacing a previously verified set. A third-party agent can perform other checks too, such as verification of system configuration (e.g., to verify that the system includes at least one transmitter and at least one receiver, and not two receivers and no transmitter for example), or limitation of the scope or time frame of a particular use of a transmitter (or receiver) seeking verification of the private keys stored therein.

In accordance with the HDCP protocol, each transmitter is required to test the key selection vector ("BKSV") received from the receiver for proper form. This is to prevent "pattern testing" by an attacker, in which the attacker asserts arbitrarily chosen KSV values to the transmitter in an effort to extract information about the private keys stored in the transmitter. However, the HDCP protocol imposes no requirement that a receiver test the key selection vector ("AKSV") that it receives from a transmitter for proper form. On a mass scale, this might allow the key space to be reverse-engineered, by an attacker that emulates a transmitter. Even bits of a KSV value having proper form can be "slid" around by an attacker in an attempt to accomplish pattern testing. A "pattern testing" attack of the type described in this paragraph can be prevented in accordance with the present invention by implementing each receiver (of a system implementing the HDCP protocol) so that it tests the key selection vector ("AKSV") that it receives during each authentication exchange for proper form.

A "pattern testing" attack of the type described above can also be prevented in accordance with the present invention by imposing additional mathematical constraints (such as maximum run-lengths), e.g., constraints beyond those specified by the HDCP protocol, on the key selection vector values employed during authentication exchanges, and implementing each receiver and transmitter to test each key selection vector that it receives during each authentication exchange for compliance with each additional such mathematical constraint. For example, in one embodiment, a receiver or transmitter (of a system implementing the HDCP protocol) is implemented to test each key selection vector that it receives during each authentication exchange (e.g., in KSV checking logic circuitry 187A shown in FIG. 7) for compliance with at least one additional mathematical constraint beyond the constraints specified by the HDCP protocol.

A "pattern testing" attack of the type described above can also be prevented in accordance with the present invention by implementing each receiver with a lockout mechanism (e.g., lockout circuitry 188 of FIG. 7) that inhibits an authentication request if too many authentication requests (more than three, for example) are received within a given time window. This can be implemented in any of a variety of ways, including the ways in which lockout mechanisms are used in password-protected computers and networks to prevent computer response to repeated assertions of passwords by an attacker.

A "pattern testing" attack of the type described above (or any other brute-force attack) can also be prevented in accordance with the present invention by implementing a receiver or transmitter to perform authentication functions so slowly that these functions simply consume too much time to be susceptible to foreseeable pattern-testing or other brute-force attacks.

Another potential attack on a system implementing the HDCP protocol is a brute force search for the shared secret value ("Km"). The shared secret value "Km" used in the HDCP protocol is only 56 bits long. This may not be long enough to prevent a brute force attack that exhaustively searches out the value. Further, the secret value is the same for any transmitter-receiver pair. If the "Km" value were learned by an attacker, the attacker could then bypass the authentication process, and might also garner information about the forty private keys stored in any given HDCP transmitter or receiver and even determine the entire private key space (the set of all possible arrays of forty private keys). Such a brute force attack can be prevented in accordance with the present invention by implementing a modified version of the HDCP protocol in which the shared secret value consists of more than 56 bits. There are several ways to accomplish this in accordance with the present invention.

Figure 4:
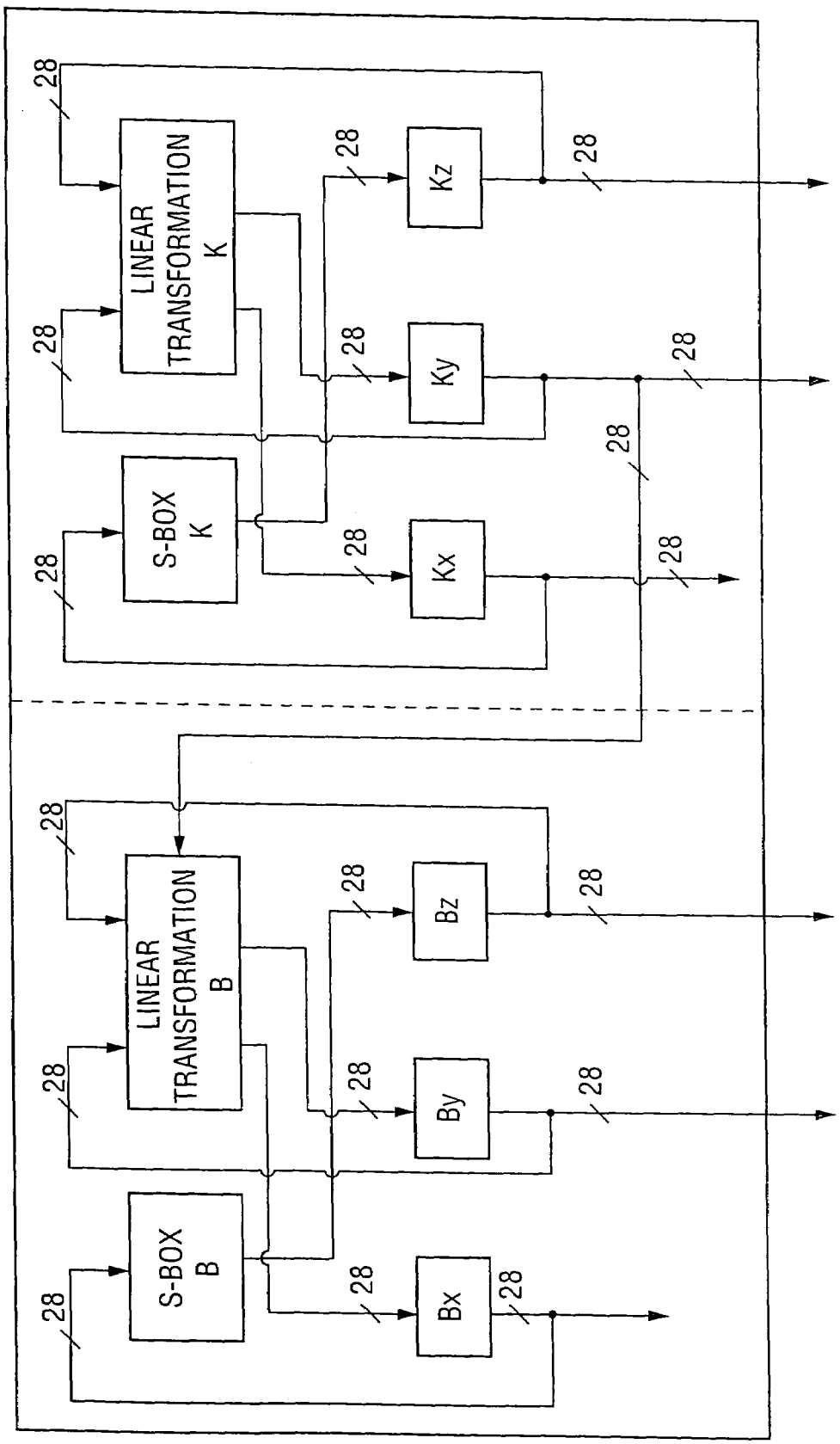
FIG. 4 is a simplified block diagram of module 81 of FIG. 3.
Figure 6:
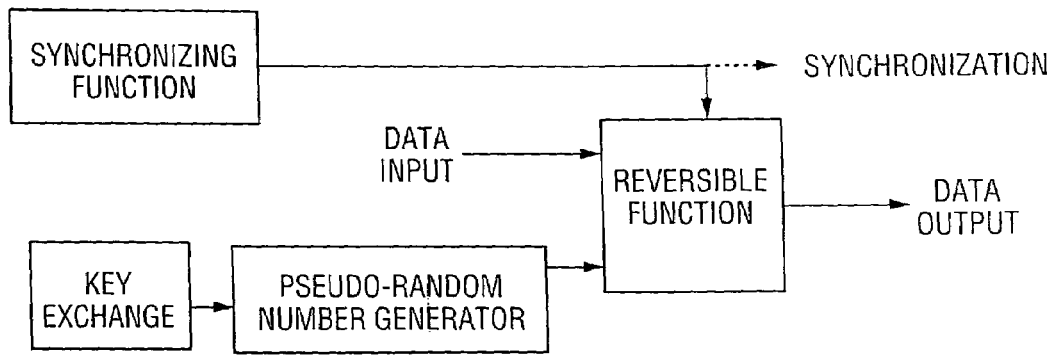
FIG. 6 is a block diagram of functions performed to encrypt (or decrypt) data in a class of typical content protection protocols.

The existing HDCP specification has a total of 168 bits that can be input to the "B" and "K" registers of the block module of a conventional HDCP cipher engine (i.e., registers Kx, Ky, Kz, Bx, By, and Bz of FIG. 4) for initialization purposes. The above-discussed An value consumes 65 of these bits, which leaves 103 bits available for the shared secret "Km." Conventionally, only 56 bits of those are used (the conventional HDCP shared secret "Km" comprises 56 bits); the other forty-seven bits are zero-filled. To implement an embodiment of the invention in which the shared secret consists of more than 56 bits but less than 104 bits, a conventional HDCP cipher engine is modified (by modifying the algorithm that it implements for shared secret generation, but without modifying its "B" and "K" registers that are conventionally used for shared secret generation) so that at least some of the conventionally zero-filled bits (in the "B" and "K" registers) are used for bits of the lengthened shared secret.

Another way to prevent successful brute force attacks in accordance with the invention is to modify the conventional "hdcpBlockCipher" function (defined at Section 4.5 of the above-referenced HDCP specification) performed at authentication, so as to increase key length. The conventional implementation of the "hdcpBlockCipher" function at authentication has two phases: the first takes the 56-bit shared secret Km (asserted to the "K" registers), and the 64-bit value "An" concatenated with a repeater bit (asserted to the "B" registers), and generates an 84-bit session key Ks in response; and the second takes the session key Ks (asserted to the "K" registers), and the value An concatenated with the repeater bit (asserted to the "B" registers), and generates the values $R_0$ and $M_0$ in response. A 65-bit value ("An" concatenated with the repeater bit) is input to the "B" registers in both phases. Although the conventional "B" registers can accept an 84-bit input field, the unused 19 bits (high-order bits) are zero-filled. Thus, a modified version of the HDCP protocol in which the "An" value is greater than 64-bits could be implemented, or otherwise to make use of the conventionally unused "B" and "K" register bits. Similarly, the two-phase conventional "hdcpBlockCipher" function (defined at Section 4.5 of the above-referenced HDCP specification) performed at each vertical blanking interval after authentication can be modified to make use of the conventionally unused "B" and "K" register bits (and/or to use new key material during each vertical blanking interval).

In any of the contemplated modifications of the HDCP protocol, the additional key material used in accordance with the invention can come from a number of sources. One source is that the current HDCP algorithm is altered to generate a longer secret value "Km" and/or a longer "An" value. Another source is an external agent that is used to distribute additional key data to the HDCP cipher engine (using some form of public-key cryptography, for example, or some other acceptable key management scheme). One example of an external agent is an internet-accessible database or certificate authority, although there are many other possibilities.

Another way to prevent successful brute force attacks in accordance with the invention is to modify is to change the conventional HDCP authentication process so that the shared secret "Km" is not constant for a transmitter-receiver pair, but somehow varies in a cryptographically secure manner. This variance is a benefit because the brute-force attack now has a moving target, and hence a much more difficult problem to solve. The variance can come from a random or pseudo-random process, or it can come from an externally supplied (yet not public) value. An external agent can be used to supply any necessary additional key data to the HDCP cipher engine (e.g., using some form of public-key cryptography or some other acceptable key management scheme). Another way to achieve the variance in the generated "Km" value is to incorporate more than one key set into each transmitter and receiver, and to implement a process to change key sets (e.g., for different sessions), thus again achieving the moving target to a brute force attacker.

Another potential attack on a system implementing the HDCP protocol is to reverse-engineer the key space mathematics. In order to reverse-engineer the key space (the space of valid arrays of forty 56-bit private keys that are useful with KSV values to generate a shared secret), access to some number of keys would be required. More importantly, the reverse-engineered keys would need to represent a broad-enough sample to provide enough information. In essence, this means that the attacker would need to have a good mix of KSV (key selection vector) values, with every one of the 40 bits containing a one in at least one case, and a zero in at least one case. If the attacker does not have a broad enough sample of KSV values, then only a partial reverse-engineering solution will be possible. This is similar to trying to solve an algebraic problem without enough equations. If the attacker has a sufficiently broad sample of the KSV values, a complete reverse-engineering solution could be possible. Among the ways to prevent successful reverse-engineering attacks of this type in accordance with the invention are the following:

reserve (i.e., never implement in a transmitter or receiver, or otherwise distribute) enough of the valid KSV values so that it is not possible for an attacker to obtain a sufficiently complete set of "stolen" KSV values having the required completeness for reverse-engineering of the HDCP key space mathematics;

reserve (i.e., never implement in a transmitter or receiver, or otherwise distribute) enough of the valid KSV values so that it is not possible for an attacker to obtain a sufficiently complete set of "stolen" KSV values, but occasionally "release" some of the reserved KSV values and switch completely over to the newly released values (i.e., manufacture only transmitters and receivers programmed with the newly released KSV values, until the next release of reserved KSV values). In this way, if some attacker has produced a partial solution, then the pirated keys generated by such an attacker will likely be useless with new equipment. The "official" HDCP keys will work properly with both old and new equipment, but pirate keys will not. Such releases would preferably be performed on a regular basis (perhaps every six months), so that the window of opportunity for pirate equipment is kept short; and modify the algorithm used in the HDCP protocol for generation of the shared secret, to replace it by an algorithm of a more asymmetric nature. Such an asymmetric algorithm would be easy to perform in the forward direction (to generate a shared secret, with knowledge of the required input values), but very difficult to perform backwards (e.g., to reverse-engineer the input values required to generate the shared secret). Among the non-linear functions that can be used in accordance with the invention to implement such an asymmetric algorithm are Elliptical functions and factoring problems.

Figure 8:
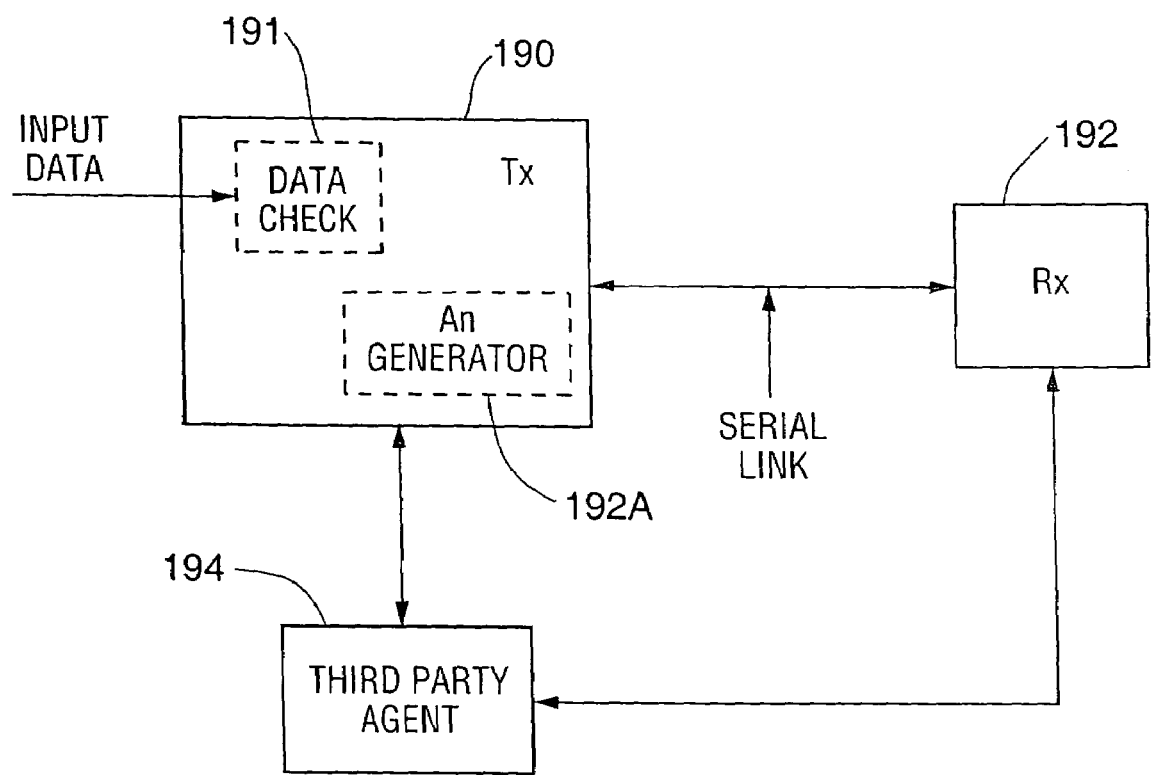
FIG. 8 is a block diagram of a system which embodies the invention.

Another potential attack on a system implementing the HDCP protocol is to swamp the revocation list. The HDCP protocol contains a mechanism for revoking a KSV that has been compromised in some fashion. The problem with this approach is that there is no defined mechanism for distributing list updates, and that the list could become very large in the worst case. There are billions of possible KSVs, and if even a small fraction of those are compromised then the revocation list might become too large to store or search in an economical way. If one or more attackers compromise enough KSVs to cause the revocation list to become too large to be used practically, the list could not be used effectively to prevent successful future attacks. Among the ways to prevent an attack of this type in accordance with the invention are the following:

store the revocation list in a centralized location, e.g., as a database maintained by a trusted third party agent (e.g., certificate authority). For example, device 194 of FIG. 8 is such a trusted third party agent (which stores a revocation list). Each of transmitter 190 and receiver 192 of FIG. 8 is configured to implement a content protection protocol and to initiate communication with device 194. Transmitter 190 can initiate a communication exchange with device 194 in which device 194 checks a value asserted thereto by transmitter 190 against the list, and causes transmitter 190 to prevent successful completion of an authorization exchange with receiver 192 when the value matches an entry on the stored list. The transmitter can access the stored list via the internet, or by dial-up, or another suitable mechanism. Preferably, the transmitter is implemented so that it must check against the stored list at least whenever a new device is added to a system in which it is used. Preferably, additional checks against the list would be performed frequently to verify whether any KSV has been added to the revocation list since the last check. To require such more frequent checking, an expiration date would be included in the "token" that enables each transmitter (such token could also supply the additional key material employed in some of the above-described embodiments for preventing successful brute force attacks); and in generating the revocation list (and implementing the transmitters that respond to it), cause revocation of a range of KSV values, or a particular family or device ID, in response to compromise of one KSV value. This would cover the case where a manufacturer has made a mistake and must recall a large number of KSV values.

An "upstream" variation on the HDCP protocol is described in the document "Upstream Link for High-bandwidth Digital Content Protection System," Revision 1.00, dated Jan. 26, 2001, by Intel Corporation, the full text of which is incorporated herein by reference. There are a number of potential attacks on a system implementing any one of a class of "upstream" variations on the HDCP protocol in which an appropriately programmed processor (to be denoted as the "upstream entity") communicates with a graphics controller (to be denoted as the "downstream entity"). Such an upstream entity (e.g., a processor executing an appropriate software application) sends data (e.g., video data) to the downstream entity after performing an authentication exchange (an "upstream authentication" exchange). The programmed processor and graphics processor can be elements of a personal computer configured to send encrypted video data from the graphics controller (this time functioning as a "transmitter" implementing the HDCP protocol) to a display device (functioning as a "receiver" implementing the HDCP protocol. Upstream authentication is particularly vulnerable to attack to the extent that any of the following factors is present: at least one of the participants is a software application (rather than hardwired, although programmable, cipher engine circuitry); a driver is used with the software application (such a driver should not be assumed to be a dumb messenger in designing the upstream authentication procedure; it should be assumed to be hacked); and there is no revocation list for the upstream authentication.

One such potential attack would proceed as follows: the attacker would discover the shared secret value for a particular combination of downstream entity (e.g., graphics controller) and upstream entity (e.g., processor executing a software application). This could be done using any of the other HDCP attack methods, such as a brute-force approach, or reverse engineering the math, for example. Close inspection or decompilation of the software source code (with which the upstream entity is programmed) might also reveal the shared secret (there are numerous well-known techniques for "hacking" software, even if it is specially written with security in mind). Once this secret value is determined, a smart driver is written that emulates a valid downstream entity (e.g., graphics controller). This driver could fool the upstream entity into believing that a working "upstream HDCP" link is in place, when in fact it is either not present or not enabled. The real danger of course is that the upstream software application can be bundled with the special driver, and then somehow distributed on a mass scale (such as over the internet). If an attacker can accomplish such distribution of attacking software, then it will be possible for even average computer users to obtain (e.g., by downloading over the internet) code that bypasses the upstream HDCP protocol altogether.

Among the ways to prevent an attack of this type (on the conventional upstream HDCP protocol) in accordance with the invention are the following:

modify the conventional upstream HDCP protocol to increase the length of the shared secret, randomize the shared secret with additional secret key material, slow down the upstream authentication exchange to defeat brute force attacks, lock out an attacker out after the attacker has made some number of authentication attempts, or otherwise modify the conventional upstream protocol in accordance with any of the above-described embodiments of the invention (e.g., those described above in the context of improving the conventional "downstream" HDCP protocol); and modify the conventional upstream HDCP protocol to establish a revocation mechanism, and preferably also to require that an upstream entity and/or downstream entity communicate with a third party "certificate authority" (or other external agent) to check an ID (e.g., an ID in the software application being executed by the upstream entity) that is (or should be) unique to the particular instance. If the upstream protocol is so modified, any mass scale distribution of "attacking software" will become readily apparent to the certificate authority and can be disallowed.

Alternatively, the transmitters and receivers that implement the downstream HDCP protocol can be implemented so that they do not also implement an upstream HDCP protocol. If end users were required to implement a standardized content protocol of their own design in order to implement any upstream content protection protocol at all, the incentive or temptation for an attacker to distribute attacking software of the described type on a mass scale would be reduced or eliminated.

Various attacks on a system implementing the HDCP protocol would use the above-mentioned value "M0" that is generated during the authentication exchange and used to generate a cryptographic signature of the KSV list that is sent upstream by a repeater in the second part of the authentication exchange (which is performed only if the receiver being authenticated is a repeater to which at least one downstream device is coupled). Such second part of the authentication exchange determines whether the status of at least one device of the system (e.g., the repeater itself, or a device downstream or upstream from the repeater) requires revocation of the repeater's authentication. The value "M0" can be used by an attacker in attacks to learn the shared secret of a transmitter-receiver pair, or to learn the initial state of the cipher engine (the cipher engine of FIG. 3) that is used to implement the HDCP protocol.

If the upstream "device" to which the "M0" value is transmitted is application software, then even if the "M0" value is passed securely to the software, confidentiality must be maintained within the software application itself. This is difficult or impossible to do in the current PC environment in a truly secure manner.

Among the ways to prevent an attack using a "M0" value (that has been transmitted upstream) in accordance with the invention are the following:

modify the authentication exchange of the upstream HDCP protocol so that the value "M0" is not transmitted upstream (for the purpose of KSV list signature or any other purpose). This eliminates the need to pass it to application software; and rather than an upstream content protection protocol in which the value "M0" is transmitted upstream, use some other upstream content protection protocol (e.g., one using a form of public-key cryptography mechanism) that does not transmit the "M0" value upstream (for cryptographic signature of a KSV list or any other purpose);

in a system including a repeater, use an upstream protocol (e.g., a modified upstream HDCP protocol) in which status information (optionally but not necessarily including a KSV value) regarding a downstream device (a device downstream from the repeater) is not transmitted through the repeater but is instead transmitted directly from the downstream device to the upstream device (e.g., application software) located upstream of the repeater. There are several reasons for bypassing the repeater in this respect. First, the downstream device will typically not have complex user interface software (as may the repeater) and will thus not have driver software (which may or may not be trustable) whereas a repeater may need to have such driver software. Second, upstream transmission of status information directly to the upstream device (rather than through a repeater which also functions to send video downstream) reduces or eliminates the potential for an attacker to re-route the video stream away from the intended target. Third, upstream transmission of status information directly to the upstream device (rather than through a repeater which also functions to send video downstream) can make it easier to detect attempts to eavesdrop on the link (or man-in-the-middle attacks).

Some potential attacks on a system implementing the HDCP protocol exploit leaked or stolen private keys. Lists of valid arrays of private keys must be made available somehow to manufacturers, so that transmitters and receivers can be programmed with them. Currently, the private keys are generated by one central entity, using a proprietary and confidential scheme that must never be revealed. The keys are then distributed (typically on a CD ROM) and must ultimately make their way to the manufacturer, where they can be incorporated into a final product. The keys must remain absolutely secure throughout this distribution chain.

The concern is that there may be leaks in the distribution chain. Keys could be stolen, or they could be left on a machine connected to the internet, or a disgruntled employee could publish them, or a design defect could allow them to be read, and so on.

Among the ways to prevent theft or other unauthorized disclosure of private keys in accordance with the invention are the following:

the keys are distributed as late as possible in the manufacturing process. This limits the complexity of the distribution chain, and hence limits the exposure to leaks. The keys could be distributed to a final user as a result of a registration process or by a third-party "certificate authority";

the keys are distributed only in an encrypted state, and are not decrypted anywhere except by a final end user of a transmitter or receiver (or by a manufacturer of the transmitter or receiver, at the manufacturing facility). This decryption could be accomplished via a registration process or by a third-party "certificate authority." Standard and well-known cryptographic mechanisms (such as RSA or PGP or some other public-key cryptography mechanism) could be used to encrypt the keys, so that the final user need only incorporate some kind of unique and verifiable code in order to decrypt the encrypted keys. For example, when the final user completes a registration process, the information required to unlock the keys could be distributed by a certificate authority to the final user; and the keys are protected via some physical or other suitable cryptographic means as soon as possible after decryption. Ideally, this is done by causing the actual HDCP hardware (in which the decrypted keys are to be stored) to do the key decryption. This would not require the involvement of a certificate authority. In practice, it might mean that the encrypted keys are distributed along one path, and the public/private keys necessary to decrypt the keys are distributed along a different path, and the encrypted keys and public/private keys (for decrypting the encrypted keys) are combined together as late in the process as possible. This way, the encrypted keys remain safe even if one path is compromised.

Another potential attack on a system implementing the HDCP protocol uses the same transmitter both to encrypt a stream of data and decrypt the encrypted data. As noted, the HDCP protocol uses the same cipher structure to encrypt and to decrypt a video stream. This means that a transmitter can first encrypt a stream, and then decrypt the same stream. To do this would require that the encrypted stream is recorded in a lossless manner before undergoing decryption. Such lossless recording is impractical or impossible with state of the art technology, but it should be expected that technology improvements will make lossless recording achievable in the future.

Once the encrypted stream is recorded, the attacker would need to feed it back through the same transmitter that generated it, after completing an authentication exchange (e.g., using the same values that were employed to trigger the generation of the encrypted stream). To do so, the attacker would need to duplicate exactly the timing with which the original authentication procedure was performed, but this will be achievable if the transmitter is implemented so as to go from a non-encrypting state to an encrypting state with predictable delay. If the authentication is accomplished and the timing of encrypted data transmission (to the transmitter) is correct, then the transmitter will properly decrypt the encrypted stream.

A variant of this attack is to use the transmitter once to encrypt the video, and then to use the same transmitter again (using the same authentication state) to encrypt a known plain text (such as all zeroes). If both the encrypted video and the encrypted plain text are recorded in a lossless manner, then the stream of pseudo-random values used to encrypt the plain text data can be exactly determined, and the latter knowledge can be used to decrypt the encrypted video of interest.

A conventional HDCP transmitter enters an initial state (after undergoing an authentication exchange) and then encrypts a set of data. Such initial state is determined by the shared secret "Km" (which is a constant) and the value "An" (which is a pseudo-random variable). An attacker has several mechanisms to ensure that the transmitter has the same value "An" at the start of the decryption phase of the attack as it did at the start of the encryption phase. For example, a typical conventional HDCP transmitter is implemented to be operable in a test mode in which the value "An" is forced to some known value, and thus the attacker could place the transmitter in the test mode prior to the decryption phase (or prior to both the encryption and decryption phases) of the attack and assert a predetermined "An" value to it. Alternatively, since the transmitter conventionally generates "An" in a pseudo-random manner (as a product of a repeatable digital function), if the attacker can exactly re-create the conditions in the transmitter that created the original value of "An," the attacker can cause the transmitter to create the same value "An" again.

Among the ways to prevent such attacks (in which the same transmitter is used to encrypt and decrypt the data of interest) in accordance with the invention are the following:

the transmitter is implemented so that, after it has entered an initial state determined by the shared secret "Km" and a value "An" (after undergoing an authentication exchange) and then encrypted a set of data, it is difficult or impossible for an attacker to place the transmitter in the same initial state. One way to accomplish this is to introduce additional randomness into the process by which the transmitter generates the value "An" prior to encrypting data. Introducing a gaussian analog effect into the pseudo-random function employed to generate "An" would make it more difficult for an attacker to cause the transmitter to generate the same "An" value during both phases of the attack. One way to do this is to incorporate a diode-based white noise source into the "An" value generation process (e.g., to include such a noise source in "An" value generation circuitry 192A in transmitter 190 of FIG. 8). Another way is to require that the transmitter employ an R-C oscillator (i.e., one affected in significant but difficult-to-predict ways by system temperature, voltage, noise, and other physical forces) to generate a variable count or time delay during the process of generating the "An" value (e.g., to include such an oscillator in "An" value generation circuitry 192A in transmitter 190 of FIG. 8). Alternatively (or additionally), any of the above-discussed methods for introducing variability into the shared secret "Km" (or distributing additional key material to increase the length of the shared secret) is employed to prevent the attacker from forcing the transmitter to employ the same shared secret value "Km" during both the encryption phase and decryption phase of the attack;

the transmitter is modified in accordance with the present invention so that it is not operable in any test mode that allows external control over the value "An," or each test mode in which the transmitter can be operated is modified to limit external control over the value "An" in some specific way. Preventing test mode operation entirely will typically be undesirable, because test modes serve a very useful purpose. However, test mode operation can be limited in either scope or in time to prevent many attacks of the described type. For example, the transmitter can be modified so that, if "An" were overwritten by an external agent, the HDCP state machines could allow authentication to proceed normally but would then intentionally scramble the resulting data. For another example, the video input to the transmitter is disabled during each test mode, and a test pattern is swapped in instead. Yet another example is to allow test mode operation only for a very short period of time (e.g., for some number of frames of input data), and then somehow "break" the link;

the encrypted data stream generated by the transmitter is "watermarked" or otherwise processed to make it difficult for an attacker to record it in a suitably loss-less way;

incorporate additional cryptography or other alterations in the process of encoding the encrypted data for transmission (e.g., the process of TMDS encoding of HDCP encrypted video data, in a system employing a DVI link to transmit the HDCP encrypted data) and decoding the encoded data at the receiver, to make it even more difficult for an attacker to suitably eavesdrop on the encrypted, encoded signal sent to the receiver by the transmitter;

incorporate analog circuitry in the circuitry employed to encode the encrypted data for transmission (e.g., the circuitry for TMDS encoding of HDCP encrypted video data, in a system employing a DVI link to transmit the HDCP encrypted data) and to decode the encoded data at the receiver, to make it easier to detect or inhibit eavesdropping on the encrypted, encoded signal sent to the receiver by the transmitter;

make variable the time delay that occurs while the transmitter transitions from a non-encrypting state into an encrypting state, and further ensure that such time delay will not be easily repeatable. This complicates the attacker's problem of obtaining the correct the timing for the second phase of the attack;

cause the transmitter to occasionally interrupt the normal timing or synchronization, either by re-authenticating or by temporarily disabling encryption (e.g., for a single frame on occasion). If this is done in a manner that is variable and difficult to repeat, it further complicates the attacker's problem of obtaining the correct the timing for the second phase of the attack;

test the data input to the transmitter (e.g., in data checking circuit 191 of transmitter 190 of FIG. 8) to detect whether an encrypted stream is being input, and if the test determines that the input data are encrypted, prevent the transmitter from further encrypting (i.e., decrypting) the encrypted input data stream. This can be done in any of a variety of ways. The transmitter can introduce into the encrypted stream to be transmitted a "header" of some kind that is easily distinguished (i.e., it could contain fields that specify the type and kind of encryption). Alternately, the transmitter can be implemented to examine the randomness of the data being input thereto. An encrypted video stream typically exhibits much more randomness than a normal video stream, and so could be distinguished in this way;

test the data input to the transmitter (e.g., in data checking circuit 191 of transmitter 190 of FIG. 8) to detect data that is obviously plain text (i.e., data that is indicative of any of one or more simple, predetermined patterns of values, for example, patterns consisting entirely of black values or white values), and prevent the transmitter from encrypting plain text; and make it more difficult for the attacker to emulate a receiver's presence during the second phase (the decryption phase) of the attack. One method for doing this is to cause the transmitter always read the receiver's current "Ri" value first (before encrypting the next frame of data), which would require that the attacker provide such "Ri" values with proper timing. Another method for doing this is to implement the transmitter so that it keeps its own "Ri" values confidential (e.g., so that the transmitter does not reveal its own "Ri" values on the DDC bus of a DVI link, as is conventionally done in systems which send HDCP encrypted data over a DVI link), so that these values cannot be used by an attacker. Another method for making it more difficult for an attacker to emulate a receiver's presence during the decryption phase of an attack requires that the transmitter abort encryption or transmission of encrypted data unless status information is periodically transmitted to the transmitter (from a receiver) using a secure method (such as public-key cryptography). Still another method for making it more difficult for an attacker to emulate a receiver's presence during the decryption phase of an attack is to modify MSEN ("monitor sense") circuitry in each transmitter (and corresponding MSEN circuitry in each receiver), so that the modified MSEN circuitry in the transmitter can distinguish between a standard receiver and one capable of HDCP operation.

Another potential attack on a system implementing the HDCP protocol uses a second transmitter to decrypt an encrypted data stream generated by a first transmitter. Just as one transmitter can both encrypt and decrypt an HDCP stream, so too can one transmitter decrypt the stream generated by another transmitter. This does not always require recording of the encrypted stream, but it does require that the decrypting transmitter have either the same set of keys as does the encrypting transmitter, or a valid set of receiver keys. A variant of this attack is to initialize a second transmitter to the same authentication state as the first transmitter, and then use a plain-text input to capture (or deduce) the pseudo-random bit stream used to encrypt the actual data of interest. Then the decryption can be accomplished by performing an XOR operation on the pseudo-random bit stream and the encrypted stream of interest, either in hardware somewhere downstream, or off-line in software. The attacker must ensure that the second transmitter operates with the proper timing, although both transmitters could conceivably be coupled to the same control bus at the same address, in which case the attacker could easily duplicate the same timing delays in both transmitters.

Among the ways to prevent attacks in which a second transmitter is used to decrypt the encrypted data of interest in accordance with the invention are the following:

many of the above-described embodiments, including the embodiments described above as being useful to prevent attacks in which the same transmitter is used to encrypt and decrypt the data of interest, and the above-described embodiment in which the transmitter checks that the BKSV value sent to it (e.g., from a receiver, but alternatively from another transmitter) does not match the AKSV value it sends to the presumed receiver, can be employed to prevent attacks in which a second transmitter is used to decrypt the encrypted data of interest;

implement each transmitter so that it is not possible for an attacker to easily authenticate two transmitters and cause them to enter the same initial (post-authorization) state. For example, the initial state is caused to be more random in any of the above-described ways. For another example, the transmitter is implemented in any of the above-described ways so that the pseudo-random "An" value that it generates cannot easily be overwritten (e.g., in a test mode) or re-created;

incorporate circuitry in each transmitter that checks for other similar devices on the same control bus to which the transmitter is connected. For example, if the control bus uses the I²C protocol (which incorporates Acknowledgement, or "Ack," signals when a write or read operation occurs, and incorporates open drain technology), circuitry can detect whether more than one driver is active at any given moment, such as by incorporating a small but variable delay before asserting an "Ack" signal and looking at the bus just before asserting an "Ack" signal to see if another device has already asserted an "Ack" signal; and incorporate analog or other circuitry in each receiver and/or each transmitter to detect eavesdropping on signals transmitted between a transmitter-receiver pair.

Another potential attack on a system implementing the HDCP protocol is to record and distribute encrypted data (e.g., a stream of encrypted video data transmitted by an HDCP transmitter) together with information that allows an attacker to decrypt the encrypted data. As normally defined, the HDCP encryption and decryption processes occur simultaneously. There is no reason that this must be the case, though. Indeed, this is not the usual case in other cryptography realms, where encryption and decryption often occur at separate points in time.

Figure 2:
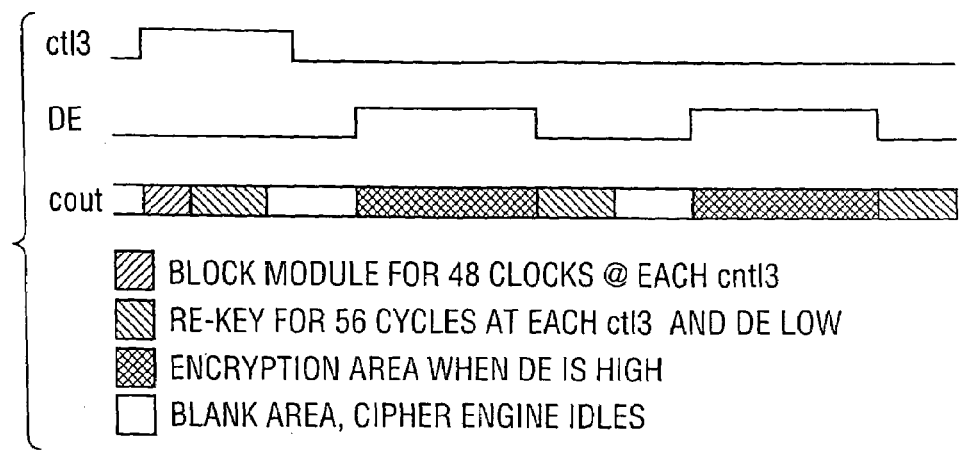
FIG. 2 is a timing diagram of signals generated conventionally to encrypt digital video data to be transmitted over a DVI link using the High-bandwidth Digital Content Protection ("HDCP") protocol.

If the encrypted data stream output from an HDCP transmitter can be recorded, then it can be decrypted later. To do this requires recording the authentication values (the "AKSV" and "An" values transmitted by the transmitter), as well as the timing (represented by the "ctl3" signal discussed above with reference to FIG. 2) information, with the encrypted data itself. The later decryption could be done either by a hacked variant of a valid and legal HDCP receiver.

Consider a case in which a brute-force or other attack reveals the shared secret "Km" of a valid HDCP transmitter-receiver pair. In this case all the information necessary to decrypt a pre-recorded encrypted stream (of the described type) is known. Now it would be possible for an attacker to distribute the stream in encrypted form (with the "AKSV," "An," and timing information) together with the shared secret necessary to decrypt it. Simple hardware (an FPGA, or an HDCP receiver ASIC modified to operate with the pre-recorded stream) could then do the decryption. Alternately, the decryption could be done off-line (not in real time) by software, which could then further process the decrypted video as necessary (this might include MPEG or some other form of compression). The decrypted, processed result could be readily distributed on a mass scale, either by DVD or internet, for example.

Among the ways to prevent such attacks in accordance with the invention are the following:

modify the HDCP protocol to increase its resistance to brute-force attacks (e.g., in any or all of the above-described ways) to make it more difficult to discover the shared secret value used to perform encryption;

increase the authentication state variability of the transmitter (e.g., in any of the above-discussed ways) to make it more difficult to record or distribute the content in encrypted form;.

include a "header" or watermark in the encrypted stream asserted by each transmitter, to aid in tracking the source of an encrypted stream. This will make it possible to use a revocation list (or a certificate authority) to stem the tide; and force each receiver (and optionally each transmitter) to prevent over-writing of a shared secret "Km" in any way, and optionally also employing any or all of the aforementioned mechanisms that protect private keys (either physically or cryptographically), and any or all of the above-described additional constraints and checks on validity of a key.

Another potential attack on a system implementing the HDCP protocol exploits the property that in the HDCP protocol, re-authentication causes the transmitter to temporarily disrupt encryption of the incoming data stream. "Re-authentication" is repetition of the authentication process while encryption is active. With this feature the link can resynchronize itself without interrupting video. Such resynchronization will occasionally be necessary because of transient faults in the link. It may also occur because of a channel-change or otherwise normally occurring event.

The transmitter and receiver may take vastly different amounts of time to re-authenticate. Re-authentication can take a relatively large amount of time (a large number of video frame periods). Further, the same logic used to perform encryption (in an HDCP transmitter or receiver) is also used during authentication, and this logic cannot easily be shared to perform both functions. Maintaining synchronization is therefore an issue that is largely ignored by the HDCP specification.

The practical result of these factors is that a conventional HDCP transmitter must temporarily stop encryption during re-authentication, and re-start encryption only when the re-authentication process has completed. Thus, the transmitter can transmit unencrypted video for the duration of re-authentication. The host can detect this at the next "link integrity check" (which may be up to two seconds later), but the host's only recourse (upon determining that a transmitter is transmitting un-encrypted video) is to stop the video feed. This is undesirable because re-authentication specifically hopes to avoid such interruptions.

Of additional concern is the length of time it may take to perform an authentication or re-authentication. If repeaters are present in the system then the whole operation may take more than four seconds. This is a long interruption, and it is also a long window in which to send theoretically protected content without actually encrypting it.

Conceivably, an attacker could initiate re-authentication at any time (a simple write to a single register inside the transmitter will initiate it). Further, re-authentication can be initiated at any time, even before a previous re-authentication has completed. Finally, it is not possible for the host software to reliably determine if and when some external agent has caused a re-authentication.

Therefore an attack is possible that uses re-authentication to disrupt or disable video encryption. This can either be done on a continuous basis, or occasionally (if it is done occasionally, then the clear video would be occasional bursts, typically of a second or two, and these will need to be collected and re-assembled off-line).

Such an attack can be prevented from succeeding in accordance with the invention, as follows:

the transmitter can be implemented to "black" out (or otherwise hide) the unencrypted video at its output whenever re-authentication occurs. This is contrary to the original intent of re-authentication, but it is more secure. One variant is to reduce the screen resolution in some way during re-authentication so that the unencrypted video is still visible and not overly disruptive, but so that the video quality is bad enough to eliminate any viable motive for an attack that seeks to obtain the video;

implement the transmitter and receiver in a manner that eliminates the need for a re-authentication function. This can be done if the need for re-authentication is diminished, such as if the link is made suitably reliable, or if interruptions from normal-use events such as channel changes are eliminated. This latter capability is an important feature in and of itself. The modified HDCP link (modified in accordance with the invention) can define a "video-mute" function that saves HDCP link state in a reliable way, interrupts the video in a controlled and secure way, and then restores the link state (and encryption) much quicker than an authentication might otherwise take place;

reduce the time required to perform re-authentication, or otherwise narrow (or eliminate) the window in which encryption is disabled and unencrypted video is transmitted by the transmitter. One method of doing this is to design the authentication state machines in such a way that re-authentication can occur while encryption is active, which requires performance of two major steps. First, the current encryption state must be adequately maintained while the cipher engine is diverted to its new purpose. Second, a synchronization point must be set that defines when the old encryption state is abandoned in favor of the new. This must happen almost simultaneously in the receiver and transmitter (because they both must start on the very same pixel). One way to do this is with a special variant of the CTL3 signal (e.g., a longer or shorter CTL3 pulse than the one normally asserted).

Another method for narrowing the window in which encryption is disabled is to divide the authentication process into two phases. The first phase generates the shared secret in the receiver and the transmitter. The second phase occurs when a repeater is present, and includes the steps of transferring and checking a KSV list. The first phase can be completed very quickly (e.g., in 100 milliseconds or less), while the second phase would typically take longer. If encryption is disabled only during the first phase, re-authentication will still cause an interruption in video encryption, so that re-authentication and could still be triggered by an attacker to disable encryption. However, especially if used in concert with one or more of the other mechanisms disclosed herein, reduction of the time during which unencrypted video is transmitted would minimize the problem being addressed;

retain data indicative of re-authentication status in each transmitter (or receiver), or in each transmitter and receiver, so that host software can more easily detect a re-authentication event caused by an attacker or other outside agent. One method to do this is to install a read-only counter that is incremented at each re-authentication event, and that can be read (e.g., by a host) with suitable message integrity (using some equivalent to upstream authentication or public-key cryptography); and/or prevent continuous re-authentication events. This can be accomplished using a lockout mechanism similar to that used for passwords (as discussed above), which is triggered by occurrence of a predetermined number of re-authentication events within a predetermined time.

Another potential attack on a system implementing the HDCP protocol exploits the property that unencrypted video is available at the input of a conventional HDCP transmitter or at the output of a conventional HDCP receiver. The strength or weakness of the HDCP protocol becomes a moot point if it can be easily bypassed. One way of obtaining access to (i.e., tapping) unencrypted data being input to an HDCP transmitter or being output from an HDCP receiver uses a soldering iron and a small number of wires. This is not a trivial task, requiring a good eye, steady hands, and careful engineering. Still, it is not so difficult that the possibility should be dismissed.

Attacks in which unencrypted video is tapped from a transmitter input or a receiver output can be prevented from succeeding in accordance with the invention, as follows:

incorporate analog circuitry or other circuitry at the transmitter input and/or the receiver output to detect tapping or other tampering. Such circuitry can include threshold detectors that look for unusual signal reflections, line impedance or capacitance values, or voltage levels; and/or use additional encryption and decryption on the data stream, to prevent assertion of unencrypted data at a transmitter input or receiver output. The new encryption function is implemented upstream from the transmitter, and the new decryption function is implemented downstream from the receiver. Ideally, the extra encryption and decryption engines are more difficult to "tap", either because each is somehow integrated, or because it is far-removed (e.g., at the remote end of an internet connection). It makes good sense to add such an additional level of encryption in an environment in which the HDCP protocol is not the only content protection technology in use. In such a case, the advantages of this approach could be accomplished by a minor re-partition of logic that is already in place.

In some of the above described embodiments, a third party "external agent" (or "certificate authority") functions to verify key selection vectors (to make sure they have not been revoked) or to verify keys to be used to generate a shared secret. The external agent (or "certificate authority") can perform one or more other functions, either in addition to or instead of this key selection vector (or key) verification function. For example, it could verify aspects of system configuration (e.g., to determine whether required elements, either hardware or software elements, are present, or to determine whether prohibited elements are present).

Preferably, a transmitter or receiver configured to implement a content protection protocol in accordance with the present invention is configured to implement more than one (and preferably as many as practical) of the attack prevention features disclosed herein. The described embodiments are, in general, not exclusive, and in some applications the best performance will be achieved when using some combination of these approaches.

It should be understood that while certain forms of the present invention are illustrated and described herein, the invention is defined by the claims and is not to be limited to the specific embodiments described and shown. For example, although some of the specific embodiments are described herein as being methods or apparatus for encrypting video data, variations on these embodiments are contemplated in which audio data (or other data), rather than video data, are encrypted.

What is claimed is:

1. A method for enabling a set of transmitters and receivers to implement a content protection protocol, said method including the steps of:
   (a) determining combinations of key selection vectors and private key sets such that each of the private key sets together with one of the key selection vectors and a predetermined algorithm determines a shared secret, such that the key selection vectors belong to a full vector set consisting of a first subset of the key selection vectors and a second subset of the key selection vectors, and the first subset of the key selection vectors excludes a sufficient number of the key selection vectors of the full vector set to prevent determination, by reverse-engineering, of the shared secret from only the private key sets and said first subset; and
   (b) distributing one of the key selection vectors in the first subset and one of the private key sets to each of the transmitters and receivers while reserving the key selection vectors of the second subset so that none of the key selection vectors in the second subset is distributed to any of the transmitters or any of the receivers.

2. The method of claim 1, wherein step (b) includes the step of storing said one of the key selection vectors in the first subset and said one of the private key sets in each of the transmitters and receivers.

3. A method for enabling a set of transmitters and a set of receivers to implement a content protection protocol, said method including the steps of:
   (a) determining combinations of key selection vectors and private key sets such that each of the private key sets together with one of the key selection vectors and a predetermined algorithm determines a shared secret, where the key selection vectors belong to a full vector set consisting of a first subset of the key selection vectors and a second subset of the key selection vectors, the first subset excludes a sufficient number of the key selection vectors of the full vector set to prevent determination, by reverse-engineering, of the shared secret from only the private key sets and said first subset of the selection vectors, and the first subset includes a third subset of the key selection vectors and a fourth subset of the key selection vectors;
   (b) during a first time interval, distributing one of the key selection vectors in the third subset and one of the private key sets to each of a first subset of the set of transmitters and to each of a first subset of the set of receivers while reserving the key selection vectors of the second subset and the fourth subset, so that none of the key selection vectors of the second subset and none of the key selection vectors in the fourth subset are distributed during the first time interval; and
   (c) during a second time interval after the first time interval, distributing one of the key selection vectors in the fourth subset and one of the private key sets to each of a second subset of the set of transmitters and to each of a second subset of the set of receivers while reserving the key selection vectors of the second subset and the third subset, so that none of the key selection vectors in the second subset and none of the key selection vectors in the third subset are distributed during the second time interval.

4. The method of claim 3, wherein step (b) includes the step of storing said one of the key selection vectors in the third subset and one of the private key sets in each of the first subset of the set of transmitters and each of the first subset of the set of receivers.

5. The method of claim 3, wherein each of the first time interval and the second time interval is substantially equal to six months.

6. A system for implementing a content protection protocol to encrypt data using a shared secret, key selection vectors of a full vector set, and private key sets, wherein each of the private key sets together with one of the key selection vectors and a predetermined algorithm determines the shared secret, the full vector set consists of a first subset of key selection vectors and a second subset of key selection vectors, the first subset of key selection vectors includes a third subset of key selection vectors and a fourth subset of key selection vectors, and the first subset excludes a sufficient number of the key selection vectors of the full vector set to prevent determination, by reverse-engineering, of the shared secret from only the private key sets and said first subset of key selection vectors, said system including:
- a first set of transmitters;
- a first set of receivers;
- a second set of transmitters; and
- a second set of receivers, wherein one of the key selection vectors in the third subset of key selection vectors and one of the private key sets have been distributed to each transmitter of the first set of transmitters and each receiver of the first set of receivers during a first time interval, one of the key selection vectors in the fourth subset of key selection vectors and one of the private key sets have been distributed to each transmitter of the second set of transmitters and each receiver of the second set of receivers during a second time interval which follows the first time interval, and the second subset of key selection vectors is reserved in the sense that none of the key selection vectors of said second subset has been distributed to any of the transmitters or to any of the receivers.

7. The system of claim 6, wherein each transmitter in the first set of transmitters and each receiver in the first set of receivers stores one of the key selection vectors in the third subset of key selection vectors and one of the private key sets, each transmitter in the second set of transmitters and each receiver in the second set of receivers stores one of the key selection vectors in the fourth subset of key selection vectors and one of the private key sets, none of the key selection vectors in the second subset of key selection vectors is stored in any of the transmitters, and none of the key selection vectors in said second subset of key selection vectors is stored in any of the receivers.

8. The system of claim 6, wherein each of the first time interval and the second time interval is substantially equal to six months.

* * * * *